United States Patent [19]

Maeda et al.

[11] Patent Number: 5,247,018

[45] Date of Patent: Sep. 21, 1993

[54] THERMOPLASTIC RESIN OF ELASTOMER COMPOSITION HAVING EXCELLENT PAINT ADHESION AND LAMINATE COMPRISING LAYER OF SAID THERMOPLASTIC ELASTOMER AND POLYURETHANE LAYER

[75] Inventors: Toshikyuki Maeda; Yasuhiko Otawa; Katsuo Okamoto, all of Ichihara, Japan

[73] Assignee: Mitsui Petrochemical Industries, Ltd., Tokyo, Japan

[21] Appl. No.: 885,257

[22] Filed: May 20, 1992

Related U.S. Application Data

[63] Continuation of Ser. No. 334,359, Apr. 7, 1989, abandoned.

[30] Foreign Application Priority Data

| Apr. 8, 1988 | [JP] | Japan | 63-84991 |
| Apr. 8, 1988 | [JP] | Japan | 63-84992 |
| Apr. 8, 1988 | [JP] | Japan | 63-84993 |
| May 24, 1988 | [JP] | Japan | 63-124891 |

[51] Int. Cl.$^5$ ............ C08L 23/36; C08L 23/16; C08L 51/06
[52] U.S. Cl. .................. 525/193; 525/380; 525/381; 525/194; 524/504; 428/424.2
[58] Field of Search ........ 525/259, 193, 380; 524/249

[56] References Cited

U.S. PATENT DOCUMENTS

| 3,288,748 | 11/1966 | Cyba | 524/249 |
| 3,651,028 | 3/1972 | Maemoto et al. | 525/380 |
| 3,751,522 | 8/1973 | Lachowicz et al. | 525/904 |
| 4,146,590 | 3/1979 | Yamamoto et al. | 525/380 |
| 4,159,287 | 6/1979 | Ames | 525/380 |
| 4,161,452 | 7/1979 | Stambaugh et al. | 525/380 |
| 4,460,646 | 7/1984 | Inoue et al. | 525/193 |
| 4,506,056 | 3/1985 | Gaylord | 525/259 |
| 4,619,972 | 10/1986 | Inoue et al. | 525/193 |
| 4,636,436 | 1/1987 | Clementini | 525/380 |
| 4,727,120 | 2/1988 | Nagues | 525/285 |
| 4,753,997 | 6/1988 | Shyu et al. | 525/259 |
| 4,780,228 | 10/1988 | Gardiner et al. | 525/259 |

*Primary Examiner*—Carman J. Seccuro, Jr.
*Attorney, Agent, or Firm*—Sherman and Shalloway

[57] ABSTRACT

A modified thermoplastic resin or elastomer composition having excellent paint adhesion is obtained by dynamically heat-treating a peroxide-crosslinkable olefin type copolymer and/or an olefin type plastic and a monomer containing at least one amino group and/or an unsaturated carboxylic acid or a derivative thereof in the presence of an organic peroxide. This thermoplastic resin or elastoemr composition is valuable as a material for an interior automotive trim. If a layer of this thermoplastic elastomer composition is laminated with a polyurethane layer, a laminate having excellent tensile strength and heat resistance, which is especially valuable as an interior trim of a vehicle such as an automobile, is obtained.

3 Claims, No Drawings

THERMOPLASTIC RESIN OF ELASTOMER COMPOSITION HAVING EXCELLENT PAINT ADHESION AND LAMINATE COMPRISING LAYER OF SAID THERMOPLASTIC ELASTOMER AND POLYURETHANE LAYER

This application is a continuation of application Ser. No. 07/334,359, filed Apr. 7, 1989, now abandoned.

BACKGROUND OF THE INVENTION (1) Field of the Invention

The present invention relates to a thermoplastic resin or elastomer composition which has an excellent paint adhesion and an excellent bondability to a metal or the like and which is excellent in the rubbery elasticity, moldability and heat resistant, and also to a laminate comprising a layer of said thermoplastic elastomer and a polyurethane layer.

More particularly, the present invention relates to a thermoplastic resin or elastomer composition formed by dynamically heat-treating (a) a peroxide-crosslinkable olefin type copolymer rubber and/or (b) an olefin type plastic, and one of (c) an unsaturated carboxylic acid or a derivative thereof and (d) a monomer containing at least one amino group or a blend of the components (c) and (d) in the presence of an organic peroxide, or by blending under heating the component, not subjected to the above-mentioned dynamic heat treatment, of said components (c) and (d) with the thermoplastic resin or elastomer formed by said dynamic heat treatment, and also to a laminate comprising a layer of a thermoplastic elastomer formed by blending (d) a monomer containing at least one amino group with a thermoplastic elastomer composition formed by dynamically heat-treating the components (a), (b) and (c) in the presence of an organic peroxide, and heat-treating the resulting blend, and a layer of a polyurethane.

(2) Description of the Related Art

It has been known that a thermoplastic elastomer is a cured rubber substitute of the energy-saving and resource-saving type.

As the thermoplastic elastomer of this type, there is known, for example, an olefin type thermoplastic elastomer composed mainly of an ethylene/propylene/uncojugated diene copolymer rubber. Although this elastomer is excellent in performances of the thermoplastic elastomer, the paint adhesion and the bondability to various resins or metals are insufficient, and therefore, the application range of this thermoplastic elastomer is extremely restricted.

A trial has been made to improve the bondability of this thermoplastic elastomer by modifying the above-mentioned rubber component with maleic anhydride or the like. However, in this case, characteristics such as the rubbery elasticity and moldability are drastically degraded, though the bondability is improved.

Even at the present, the paint adhesion and the bondability to various resins or metals are similarly insufficient in thermoplastic resins such as polyolefins.

Namely, a thermoplastic resin or elastomer which is excellent in not only such characteristics as the rubbery elasticity and moldability but also the paint adhesion and the bondability to various resins and metals is not known.

A polyvinyl chloride sheet having on the surface a leather pattern formed by embossing the surface and boarding the embossed surface has been heretofore used for interior automotive trims such as a floor, a wall and a ceiling.

However, since a plasticizer is incorporated in polyvinyl chloride per se, this polyvinyl chloride sheet is defective in that the surface becomes soft and sticky, and by evaporation of the plasticizer, the sheet is made rigid or the atmosphere in an automobile becomes blurred.

A laminate formed by backing a polyvinyl chloride sheet with a formed layer and, if necessary, further with a resin aggregate layer has been used instead of a single-layer sheet of polyvinyl chloride.

This laminate is prepared through the following steps.

(1) Soft polyvinyl chloride is calendered to form a sheet.

(2) A mixture of a polyol and a polyisocyanate is coated on the surface of this sheet and a urethane treatment is carried out to attain a delustering effect.

This delustering treatment is performed to prevent the sheet surface from becoming lustrous at the heat-molding step (7) described hereinafter.

(3) The sheet is subjected to an embossing treatment to form a boarded leather pattern on the surface.

(4) The back surface of the sheet having the embossed surface is subjected to a flame treatment and is molten, and a sheet of a polyurethane foam separately supplied is press-bonded to the molten back surface of the sheet by means of a roll.

(5) An adhesive layer is formed on the polyurethane foam sheet side if the formed laminate comprising the polyvinyl chloride sheet and the polyurethane foam sheet.

(6) A resin aggregate having a predetermined shape is formed by the heat-forming method such as vacuum forming or air-pressure forming.

(7) The polyvinyl chloride sheet/polyurethane foam sheet laminate is preliminarily heated and placed on the resin aggregate formed body, and the assembly is heat-molded and integrated.

As is apparent from the foregoing description, the conventional laminate to be used for interior automotive trims is defective in that the preparation steps are much complicated.

Furthermore, since this laminate comprises a soft polyvinyl chloride sheet containing a plasticizer, as pointed out hereinbefore, the laminate is disadvantageous in that the surface is soft and sticky and the atmosphere in an automobile becomes blurred.

SUMMARY OF THE INVENTION

We made research with a view to solving the foregoing problems involved in the conventional techniques and providing a thermoplastic resin or elastomer composition having an excellent paint adhesion and an excellent heat bondability to various resins and metals and being excellent in the rubbery elasticity, moldability and heat resistance.

More specifically, in accordance with the present invention, there is provided a thermoplastic resin or elastomer composition formed by dynamically heat-treating (a) a peroxide-crosslinkable olefin type copolymer rubber and/or (b) an olefin type plastic [the total amount of the components (a) and (b) is 100 parts by weight], and one of (c) 0.001 to 100 parts by weight of an unsaturated carboxylic acid or a derivative thereof and (d) 0.01 to 100 parts by weight of a monomer containing at least one amino group or a blend of the components (c) and (d) in the presence of an organic peroxide, or by heating under heating the component, not subjected to the above-mentioned dynamic heat treatment, of said components (c) and (d) with the thermoplastic resin or elastomer formed by said dynamic heat treatment.

Furthermore, in accordance with the present invention, there is provided a laminate comprising a layer of a thermoplastic elastomer formed by blending (d) 0.01 to 10 parts by weight of a monomer containing at least one amino group with a thermoplastic elastomer composition formed by dynamically heat-treating the components (a), (b) and (c) in the presence of an organic peroxide, and heat-treating the resulting blend, and a layer of a polyurethane.

Moreover, in accordance with the present invention, there is provided a thermoplastic resin or elastomer composition in which the blend to be dynamically heat-treated further comprises at least one additive selected from the group consisting of (e) 0.01 to 100 parts by weight of a peroxide-uncrosslinkable rubbery substance, (f) 0.01 to 200 parts by weight of a mineral oil type softener and (g) 0.01 to 100 parts by weight of a fibrous filler, per 100 parts by weight of the total amount of the components (a) and (b).

Namely, the thermoplastic resin or elastomer composition of the present invention includes (1) an embodiment in which the components (a), (b) and (c) are dynamically heat-treated in the presence of an organic peroxide and the component (d) is blended in the heat-treated mixture, (2) an embodiment in which the components (a), (b) and (c) are dynamically heat-treated in the presence of an organic peroxide and, optionally, the component (c) is blended in the obtained thermoplastic resin or elastomer, and (3) an embodiment in which the components (a), (b), (c) and (d) are dynamically heat-treated in the presence of an organic peroxide.

Each of the foregoing embodiments (1), (2) and (3) further includes a modification in which the blend to be dynamically heat-treated further comprises specific amounts of the components (e), (f) and (g) per 100 parts by weight of the sum of the components (A) and (b).

The most important technical characteristic of the thermoplastic resin or elastomer composition of the present invention resides in that the respective components are dynamically heat-treated in the presence of an organic peroxide in each embodiment.

This thermoplastic resin or elastomer composition has an excellent paint adhesion and an excellent heat bondability to various resins and metals and is excellent in the rubbery elasticity, moldability and heat resistance. Furthermore, a laminate comprising a layer of this thermoplastic elastomer and a layer of a polyurethane is excellent in the tensile strength, heat resistance, softness and light weight characteristic and is especially valuable as interior automotive trims.

DETAILED DESCRIPTION OF THE PREFERRED EMBODIMENTS

In the thermoplastic resin or elastomer composition of the present invention, the peroxide-crosslinkable olefin type copolymer rubber as the component (a) is a component imparting a rubbery elasticity to the resulting composition, and a partially crosslinked copolymer rubber is excellent in the heat resistance.

The olefin type plastic as the component (b) is a component imparting flowability at a high temperature, whereby a desired moldability is retained in the elastomer.

The unsaturated carboxylic acid or its derivative as the component (c) improves the heat bondability to various resins and metals, and the monomer containing at least one amino group in the molecule chain as the component (d) drastically improves the paint adhesion and also improves the bondability to a polyurethane layer.

The peroxide-uncrosslinkable rubbery substance as the component (e) and the mineral oil type softener as the component (f) improve the flowability of the rubber composition and impart a moldability, as well as the olefin type plastic as the component (b), and the fibrous filler as the component (g) imparts a dimension stability (small linear expansion coefficient) and a shape stability (appropriate rigidity) to the composition.

These components (e), (f) and (g) can be incorporated before or during the heat treatment of the composition.

In the thermoplastic resin or elastomer composition, by the actions of the above-mentioned respective components, the paint adhesion and the heat bondability to various resins and metals are prominently improved while retaining desired rubbery elasticity, heat resistance and moldability, and if the fibrous filler is incorporated, an effect of improving the dimension stability and shape stability can be attained in addition to the above-mentioned effect.

The respective components of the thermoplastic resin or elastomer composition of the present invention will now be described in detail.

(a) Peroxide-crosslinkable Olefin Type Copolymer Rubber

The peroxide crosslinkable olefin type copolymer rubber used in the present invention is an amorphous elastic copolymer composed mainly of an olefin, such as an ethylene/propylene copolymer rubber, an ethylene/propylene/uncojugated diene rubber or an ethylene/butadiene copolymer rubber, and when this rubber is mixed with an organic peroxide and the mixture is kneaded under heating, the rubber is crosslinked and the flowability is reduced or the flowability is lost. Incidentally, by the uncojugated diene is meant dicyclopentadiene, 1,4-hexadiene, dicyclooctadiene, methylenenorbornene, ethylidenenorbornene or the like.

In the present invention, of these copolymer rubbers, there are preferably used ethylene/propylene copolymer rubbers and ethylene/propylene/unconjugated rubbers in which the molar ratio of ethylene units to propylene units (ethylene/propylene) is from 50/50 to 90/10, especially from 55/45 to 85/15. Ethylene/propylene/unconjugated copolymer rubbers, particularly an ethylene/propylene/5-ethylidene-2-norbornene copolymer rubber and an ethylene/propylene/5-ethylidene-2-norbornene/dicyclopentadiene quadripolymer, are especially preferred because a thermoplastic elastomer excellent in heat resistance, tensile characteristics and repulsive elasticity is obtained.

It is preferred that the Mooney viscosity $ML_{1+4}$ (100° C.) of the copolymer rubber be 10 to 150, especially 40 to 120. If the Mooney viscosity of the copolymer rubber is within this range, an elastomer composition having excellent tensile characteristics and flowability is obtained.

It also is preferred that the iodine value (unsaturation degree) of the copolymer rubber be smaller than 16. If the iodine value is within this range, a thermoplastic elastomer which is well-balanced in the flowability and rubbery characteristics is obtained.

(b) Olefin Type Plastic

The olefin type plastic used in the present invention is a crystalline high-molecular-weight solid product obtained by polymerizing at least one olefin by the high-pressure process or low-pressure process. As an instance of this resin, there can be mentioned a homopolymer or copolymer resin of at least one isotactic or syndiotactic monoolefin. Typical resins are commercially available.

As the starting olefin, there are appropriately used, for example, ethylene, propylene, 1-butene, 1-pentene, 1-hexane, 2-methyl-1-propane, 3-methyl-1-pentene, 4-methyl-1-pentene, 5-methyl-1-hexane, 1-octene, 1-decene and mixtures of two or more of these olefins. As the polymerization form, either random polymerization or block polymerization can be adopted, so far as a resinous product is obtained.

A peroxide-separating olefin type plastic and polyethylene are especially preferred as the olefin type plastic.

By the peroxide separating olefin type plastic is meant an olefin type plastic characterized in that when it is mixed with a peroxide and the mixture is kneaded under heating, the plastic is thermally decomposed to reduce the molecular weight and the flowability of the resin is increased. For example, there can be mentioned isotactic polypropylene and copolymers of propylene with small amounts of other α-olefins, such as a propylene/ethylene copolymer, a propylene/1-butene copolymer, a propylene/1-hexene copolymer and a propylene/4-methyl-1-pentene copolymer. It is preferred that the melt flow rate (ASTM D-1238-65T, 230° C.) of the olefin type plastic used in the present invention be 0.1 to 50, especially 5 to 20. In the present invention, the olefin type plastic exerts functions of improving the flowability of the composition and improving the heat resistance of the composition.

(c) Unsaturated carboxylic acid or its derivative

As the unsaturated carboxylic acid or its derivative to be used as the component (c) in the present invention, there can be mentioned α,β-unsaturated carboxylic acids such as acrylic acid, methacrylic acid, maleic acid, fumaric acid, itaconic acid, citraconic acid and tetrahydrophthalic acid, unsaturated carboxylic acids such as bicyclo[2,2,1]hepto-2-ene-5,6-dicarboxylic acid, α,β-unsaturated carboxylic anhydrides such as maleic anhydride, itaconic anhydride, citraconic anhydride and tetrahydrophthalic anhydride, unsaturated carboxylic anhydrides such as bicyclo[2,2,1]hepto-2-ene-5,6-dicarboxylic anhydride, and unsaturated carboxylic acid esters such as methyl acrylate, methyl methacrylate, dimethyl maleate, monomethyl maleate, diethyl fumerate, dimethyl itaconate, diethyl citraconate, dimethyl tetrahydrophthalate anhydride and dimethyl bicyclo[2,2,1]hepto-2-ene-5,6-dicarboxylate. Of these acids and derivatives, maleic acid, bicyclo[2,2,1]hepto-2-ene-5,6-dicarboxylic acid and anhydrides thereof are preferred. This component (c) improves the bondability of the composition.

(d) Monomer Containing at Least One Amino Group

As the monomer containing at least one amino group in the molecule chain, which is used as the component (d) in the present invention, there can be mentioned amino alcohols such as 2-aminoethanol, 3-amino-1-propanol, 4-amino-1-butanol, 5-amino-1-pentanol, 2-amino-1-butanol, 2-amino-2-methyl-1-propanol, 2-amino-2-methyl-1,3-propanediol, 2-amino-2-ethyl-1,3-propanediol and N-aminoethylethanolamine, diamines such as ethylenediamine, propylenediamine, trimethyldiamine, tetramethylenediamine, pentamethylenediamine and hexamethylenediamine, polyamines such as diethylenetriamine, triethylenetetramine and tetraethylenepentamine, dicarboxylic acid amides such as oxamide, malonamide, succinamide, adipamide, malamide and d-tartramide, hydrazines such as methylhydrazine and ethylhydrazine, and aromatic amines such as phenylenediamine, toluenediamine, N-methylphenylenediamine, aminodiphenylamine and diaminodiphenylamine.

The component (d) improves the pain adhesion to the resin or elastomer composition.

Among the foregoing monomers, aminoalcohols and polyamines are preferred, and N-aminoethylethanolamine and triethylenetetramine are especially preferred.

If a blend of the thermoplastic elastomer with the component (d) is heat-treated, the bondability of the obtained thermoplastic elastomer to a polyurethane is highly improved.

(e) Peroxide-Uncrosslinkable Rubbery Substance

The peroxide-uncrosslinkable rubbery substance used in the present invention is a hydrocarbon rubbery substance characterized in that even if the rubbery substance is mixed with a peroxide and the mixture is kneaded under heating, the flowability is not reduced. For example, there can be mentioned polyisobutylene, butyl rubber (IIR), a propylene/ethylene copolymer rubber having a propylene content of at least 70 mole % and atactic polypropylene. In view of the performance and handling easiness, polyisobutylene and butyl rubber (IIR) are preferred among them.

The component (e) improves the flowability of the resin or elastomer composition, and a rubbery substance having a Mooney viscosity lower than 60 is especially preferred.

Furthermore, the component (e) improves the permanent set of the thermoplastic resin or elastomer composition.

(f) Mineral oil type softener

The mineral oil type softener used as the component (f) is a high-boiling-point petroleum faction which is ordinarily used for roll-processing of a rubber to weaken the intermolecular force of the rubber and facilitate the processing and which assists dispersion of an incorporated filler such as carbon black or white carbon or reduces the hardness of a cured rubber to increase the softness and elasticity. This petroleum fraction is divided into a paraffinic fraction, a naphthenic fraction and an aromatic fraction.

(g) Fibrous Filler

A fibrous filler having a diameter of about 0.1 to about 15 μm and a length of about 5 μm to about 10 mm is preferably used as the component (g) in the present invention. As specific examples, there can be mentioned a glass fiber (chopped strand, roving, milled glass fiber, glass flake or the like), wollastonite, a cut fiber, a rock fiber, a microfiber, a processed mineral fiber, a carbon fiber, a gypsum fiber, an aromatic polyamide fiber and a potassium titanate fiber. Among them, a milled glass fiber, a glass flake and a potassium titanate fiber are preferred. In order to improve the wettability of the fibrous filler with the thermoplastic elastomer as the matrix, use of a fibrous filler treated with a coupling agent such as a silane coupling agent, a chromium coupling agent or a titanium coupling agent is especially preferred.

The fibrous filler can be added at the grafting step or the subsequent step.

Preparation of Thermoplastic Resin or Elastomer Composition

In the case where the composition of the present invention is a resin composition, 0 to 10 parts by weight, preferably 0 to 7 parts by weight, especially preferably 0 to 3 parts by weight of the peroxide-crosslinkable olefin type copolymer rubber (a) and 90 to 100 parts by weight, preferably 93 to 100 parts by weight, especially preferably 97 to 100 parts by weight, of the olefin type plastic (b) [the sum of the components (a) and (b) is 100 parts by weight], and the components (c) and (d) are dynamically heat-treated according to any of the following embodiments.

In the case where the composition of the present invention is an elastomer composition, 100 to 10 parts by weight, preferably 95 to 10 parts by weight, especially preferably 95 to 40 parts by weight, of the peroxide-crosslinkable olefin type copolymer rubber (a) and 0 to 90 parts by weight, preferably 5 to 90 parts by weight, especially preferably 5 to 60 parts by weight, of the olefin type plastic (b) [the sum of the components (a) and (b) is 100 parts by weight], and the components (c) and (d) are dynamically heat-treated according to any of the following embodiments.

Embodiment 1

In this embodiment, the components (a), (b) and (c) are dynamically heat-treated in the presence of an organic peroxide and the component (d) is blended in the heat-treated mixture under heating.

According to a preferred example of this embodiment 1, 100 parts by weight of the component (a) and/or the component (b), is blended with 0.01 to 10 parts by weight, preferably 0.1 to 5 parts by weight, of an unsaturated carboxylic acid anhydride (c) and the blend is dynamically heat-treated in the presence of an organic peroxide, and 0.01 to 10 parts by weight, preferably 0.1 to 10 parts by weight, of a monomer (d) having at least one amino group is blended under heating into the obtained thermoplastic resin or elastomer, whereby the intended thermoplastic resin or thermoplastic elastomer composition is prepared. If the heating is carried out to a temperature of 140° to 250° C., a thermoplastic resin or elastomer composition excellent in various characteristics can be obtained.

Embodiment 2

In this embodiment, the components (a), (b) and (d) are dynamically heat-treated simultaneously in the presence of an organic peroxide and, optionally, the component (c) is blended under heating into the obtained thermoplastic resin or elastomer.

According to a preferred example of this embodiment 2, 100 parts by weight of the component (a) and/or the component (b) is blended with 0.01 to 10 parts by weight, preferably 0.1 to 5 parts by weight, of a monomer (d) having at least one amino group and the blend is dynamically heat-treated in the presence of an organic peroxide, and, optionally, 0.01 to 10 parts by weight, preferably 0.1 to 5 parts by weight, of an unsaturated carboxylic acid anhydride (c) is blended under heating into 100 parts by weight of the thermoplastic resin or elastomer. In this embodiment 2, the same heating condition as adopted in the embodiment 1 is adopted.

Embodiment 3

In this embodiment, the components (a), (b), (c) and (d) are dynamically heat-treated simultaneously in the presence of an organic peroxide.

According to a preferred example of this embodiment 3, 100 parts by weight of the component (a) and/or the component (b) is blended with 0.01 to 10 parts by weight, preferably 0.1 to 5 parts by weight, of an unsaturated carboxylic acid or its derivative (c) and 0.01 to 10 parts by weight, preferably 0.1 to 10 parts by weight, of a monomer (d) containing at least one amino group, and the blend is dynamically treated in the presence of an organic peroxide, whereby a desired thermoplastic resin or elastomer composition is obtained. In this embodiment 3, the same heating condition as adopted in the embodiment 1 is adopted.

Each of the foregoing embodiments 1, 2 and 3 of the thermoplastic resin or elastomer composition of the present invention includes the following modification.

Namely, according to this modification, at least one additive selected from the group consisting of 0.01 to 100 parts by weight, preferably 5 to 100 parts by weight, especially preferably 5 to 50 parts by weight, of a peroxide-uncrosslinkable rubbery substance (e), 0.01 to 200 parts by weight, preferably 3 to 100 parts by weight, especially preferably 3 to 80 parts by weight, of a mineral oil type softener (f) and 0.01 to 100 parts by weight, preferably 1.0 to 100 parts by weight, especially preferably 4 to 35 parts by weight of a fibrous filler (g), per 100 parts by weight of the sum of the components (a) and (b), is blended in a composition to be dynamically heat-treated, and the blend is dynamically heat-treated in the presence of an organic peroxide to effect partial crosslinking.

By incorporating the component (a) in the above-mentioned amount, a composition which is excellent in rubbery characteristics such as the rubbery elasticity and has high flowability and moldability is obtained.

If the components (b), (e) and (f) are incorporated in the above-mentioned amounts, a composition which is excellent in rubbery characteristics such as the rubbery elasticity and has high flowability and moldability is obtained.

Furthermore, by incorporating the components (c) and (d) in the above-mentioned amounts, the paint adherence, the moldability and the heat bondability to resins or metals are highly improved. Moreover, if the component (g) is incorporated in the above-mentioned amount, the flowability, dimension stability and shape stability are improved.

In accordance with still another embodiment of the present invention, there is provided a laminate comprising (A) a layer of a thermoplastic elastomer formed by dynamically heat-treating a blend of 100 parts by weight of a mixture comprising components (a) and (b) at as weight ratio of from 10/90 to 90/10, preferably from 20/80 to 80/20, and 0.01 to 10 parts by weight of an unsaturated polyvalent carboxylic acid or its anhydride (c) in the presence of an organic peroxide to effect partial crosslinking, blending 0.01 to 10 parts by weight of a monomer (d) containing at least one amino group into the formed partially crosslinked thermoplastic elastomer composition and heat-treating the blend, and (B) a layer of a polyurethane. This laminate is excellent in tensile strength, heat resistance, softness and light weight characteristic, has no surface stickiness and is very valuable as an interior automotive trim. Furthermore, since the component (c) is blended and heat-treated, the layer (A) of this laminate has excellent flowability, aging resistance and rubbery elasticity and strong bonding is attained in the interface between the layers (A) and (B).

The polyurethane constituting the layer (B) has oil resistance and scratch resistance, and therefore, predetermined oil resistance and scratch resistance can be retained on one surface of the laminate.

If the layer (B) is constructed by a polyurethane foam, softness and light weight characteristic can be imparted to the laminate.

At least one additive selected from the group consisting of (e) a peroxide-uncrosslinkable rubber substance, (f) a mineral oil type softener and (g) a fibrous filler can be incorporated into the layer (A)—constituting thermoplastic elastomer comprising the components (a), (b), (c) and (d). Namely, up to 100 parts by weight of the component (e), up to 200 parts by weight of the component (f) and up to 100 parts by weight of the component (g) can be incorporated per 100 parts by weight of the sum of the components (a) and (b).

The additives (e) and (f) are effective for improving the molding processability of the thermoplastic elastomer, and the additive (g) is effective for improving the rigidity.

In the laminate of the present invention, a polyolefin type plastic can be blended into the partially crosslinked thermoplastic elastomer composition. In this case, the polyolefin type plastic (A) is preferably blended into the thermoplastic elastomer composition (B) at an (A)/(B) weight ratio of from 0/100 to 75/25. Namely, it is preferred that the polyolefin type plastic be blended in an amount of up to 300 parts by weight, especially up to 200 parts by weight, per 100 parts by weight of the thermoplastic elastomer composition.

Known polyolefin plastics can be used as the polyolefin plastic to be blended into the thermoplastic elastomer composition. For example, there can be mentioned high-density polyethylene, medium-density polyethylene, low-density polyethylene, isotactic polypropylene, and copolymers of propylene with small amounts of other α-olefins, such as a propylene/ethylene copolymer, a propylene/1-butene copolymer, a propylene/1-hexene copolymer and a propylene/4-methyl-1-pentene copolymer. It is preferred that the melt index (ASTM D-1238-65T, 230° C.) of the polyolefin type plastic to be blended be 0.1 to 50, especially 5 to 20. In the present invention, the polyolefin type plastic exerts functions of improving the flowability and heat resistance of the composition.

Polyurethane layer (B)

All of known polyurethanes can be used as the polyurethane of the layer (B) to be laminated with the thermoplastic elastomer layer (A). For example, there can be used polyester type polyurethanes and polyether type polyurethanes classified according to the kind of the starting polyol component, and there can be used soft, semi-hard and hard polyurethanes classified according to the hardness.

In the case where the laminate of the present invention is used as an interior trim of a vehicle such as an automobile, it is preferred that the layer (B) be shaped in the form of a polyurethane sheet. In this case, in view of the easiness of lamination, use of a thermoplastic polyurethane is preferred.

A polyurethane foam can be used as the layer (B). In view of the softness, heat resistance and sound adsorption, a soft foam having a substantially continuous cell structure and a foaming ratio of about 10 to about 100 is preferably used.

Structure of Laminate

The laminate of the present invention can be prepared by laminating the thermoplastic elastomer layer (A) with the polyurethane layer (B).

The lamination method is appropriately selected according to the shape or size of the final product and the required properties. For example, the following methods can be adopted.

In the case where a polyurethane is used as the polyurethane layer (B), the following methods can be adopted.

(1) The preliminarily formed layers (A) and (B) are heat-fusion-bonded at a temperature higher than the temperature where at least one of the layers (A) and (B) is molten, by using a calender roll forming machine, a compression forming machine or the like.

(2) The preliminarily sheet-formed layer (B) is heat-fusion-bonded to the layer (A) being extrusion-molded or calender-molded.

(3) The layer (A) and (B) are co-extrusion-molded and heat-fusion-bonded by using a multi-layer extrusion molding machine.

In the case where a polyurethane foam is used as the polyurethane layer (B), there can be adopted a method in which a graft-modified polyolefin type elastomer is formed into a sheet by extrusion molding or calender molding, and this sheet is laminated with a polyurethane foam sheet by using a compression roll.

In the so-prepared laminate of the present invention, the thickness of the thermoplastic elastomer layer (A) is generally 0.1 to 50 mm and the thickness of the polyurethane layer (B) is generally 5 μm to 10 mm, though the thickness is changed more or less according to the intended use or the like.

Additives can be incorporated in the thermoplastic resin or elastomer composition of the present invention, so far as the paint adhesion, flowability (moldability), rubbery properties and heat bondability of the composition are not degraded. For example, fillers such as calcium carbonate, calcium silicate, clay, kaolin, talc, silica, diatomaceous earth, mica powder, alumina, barium sulfate, aluminum sulfate, calcium sulfate, basic magnesium carbonate, molybdenum disulfide, graphite, glass fiber, glass bead, shirasu balloon and carbon fiber, and colorants such as carbon black, titanium oxide, zinc flower, red iron oxide, ultramarine, prussian blue, azo pigment, nitroso pigment, lake pigment and phthalocyanine pigment can be incorporated.

Furthermore, in the present invention, known heat-resistant stabilizers such as phenol type, sulfite type, phenylalkane type, phosphite type and amine type stabilizers, aging-preventing agents, weathering agents, antistatic agents and lubricants such as metal soaps and waxes can be incorporated in amounts customarily incorporated into olefin type plastics or olefin type copolymer rubbers.

In the present invention, the blend of the above-mentioned components is dynamically heat-treated in the presence of an organic peroxide to effect partial crosslinking.

Incidentally, by the term "dynamic heat treatment" is meant kneading in the molten state.

In the present invention, as the organic peroxide, there can be used, for example, dicumyl peroxide, di-tert-butyl peroxide, 2,5-dimethyl-2,5-di-(tert-butylperoxy)hexane, 2,5-dimethyl-2,5-di-(tert-butylperoxy)-hexine-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dicyclobenzoyl peroxide, tert-butyl peroxybenzoate, tert-butyl perbenzoate, tert-butylperoxyisopropyl carbonate, diacetyl peroxide, lauroyl peroxide and tert-butylcumyl peroxide. In view of the smell and scorch stability, 2,5-dimethyl-2,5 di-(tert-butylperoxy)hexane, 2-5-dimethyl-2,5-di-(tert-butylperoxy)hexine-3, 1,3-bis(tert-butyl-peroxyisopropyl)benzene, 1,1-bis(tert-butylperoxy)-3,3,5-trimethylcyclohexane and n-butyl-4,4-bis(tert-butylperoxy)valerate are preferred, and 1,3-bis(tert-butylperoxyisopropyl)benzene is especially preferred.

The amount incorporated of the organic peroxide is adjusted to 0.01 to 3% by weight, preferably 0.05 to 1% by weight, based on the sum of the components (a), (b) and (c).

If the amount incorporated of the organic peroxide is adjusted within the above-mentioned range, in the obtained thermoplastic resin or elastomer, the heat resistance, tensile characteristics and rubbery properties such as elastic recovery and repulsive elasticity become satisfactory, and the moldability is improved.

In the present invention, at the partial crosslinking treatment with the above-mentioned organic peroxide, there can be used peroxy-crosslinking assistants such as sulfur, p-quinone dioxime, p,p'-dibenzoylquinone dioxide, N-methyl-4,4-dinitrosoaniline, nitrobenzene, diphenylguanidine and trimethylolpropane-N,N-m-phenylene dimaleimide, and polyfunctional vinyl monomers such as divinylbenzene, triallyl cyanurate, polyfunctional methacrylate monomers, e.g., ethylene glycol dimethacrylate, diethylene glycol dimethacrylate, polyethylene glycol dimethacrylate, trimethylolpropane trimethacrylate and allyl methacrylate, and vinyl butyrate and vinyl stearate. By addition of a compound as mentioned above, uniform and mild reaction can be expected. In the present invention, use of divinylbenzene is especially preferred, because divinylbenzene is easy to handle and divinylbenzene has a good compatibility with the olefin type rubber and olefin type plastic as the main components of the blend to be treated. Furthermore, since divinylbenzene has an organic peroxide-solubilizing action and acts as a dispersing assistant for the peroxide, the heat treatment effect is uniformalized and a composition which is well-balanced in the flowability and physical properties can be obtained. In the present invention, it is preferred that the above-mentioned crosslinking assistant or polyfunctional vinyl monomer be incorporated in an amount of 0.1 to 2% by weight, especially 0.3 to 1% by weight, based on the entire blend to be treated. In the case where the amount of the crosslinking assistant or polyfunctional vinyl monomer exceeds 2% by weight, when the amount of the organic peroxide is large, the crosslinking reaction is advanced and the flowability of the composition is degraded, or when the amount of the organic peroxide is small, the above-mentioned assistant or monomer is left as the unreacted monomer in the composition and the unreacted monomer changes the physical properties by the heat history during processing and molding of the composition. Accordingly, incorporation of the crosslinking assistant or polyfunctional vinyl monomer in an excessive amount should be avoided.

In the order to promote decomposition of the organic peroxide, a tertiary amine such as triethylamine, tributylamine or 2,4,6-tris(dimethylamino)phenol or a decomposition promoting agent such as a naphthenic acid salt of aluminum, cobalt, vanadium, copper, calcium, zirconium, manganese, magnesium, lead or mercury can be used.

It is preferred that kneading be carried out in a closed apparatus in an atmosphere of an inert gas such as nitrogen or carbon dioxide gas. The temperature is such that the half-value period of the organic peroxide used is within 1 minute. Namely, the temperature is generally 150° to 280° C. and preferably 170° to 240° C. The kneading time is generally 1 to 20 minutes and preferably 1 to 10 minutes. The applied shearing force is ordinarily 10 to $10^4$ sec$^{-1}$ and preferably $10^2$ to $10^3$ sec$^{-1}$, expressed as the shearing speed.

As the kneading apparatus, there can be used a mixing roll, an intensive mixer such as a Banbury mixer, and a single-screw or twin-screw extruder.

According to the present invention, by the above-mentioned dynamic heat treatment, an uncrosslinked, partially crosslinked or completely crosslinked and modified thermoplastic resin or elastomer composition can be obtained.

In the present invention, by the "uncrosslinking", it is meant that the gel content measured, for example, by the following method is lower than 10%, and by the "partial or complete crosslinking", it is meant that the gel content measured, for example, by the following method is at least 10%, especially at least 20%.

Measurement of Gel Content

A sample (100 mg) of a thermoplastic elastomer is cut into a strip of 0.5 mm × 0.5 mm × 0.5 mm and immersed in 30 ml of cyclohexane at 23° C. for 48° C. in a closed vessel. The sample was taken out on a filter paper and is dried at room temperature for more than 72 hours until the weight is constant.

The weight obtained by subtracting the weight of the cyclohexane-insoluble components (the fibrous filter, the filter, the pigment and the like) other than the polymer component and the weight of the olefin type plastic component before the immersion in cyclohexane from the weight of the residue after the drying is designated as "corrected final weight (Y)".

The weight of the peroxide-crosslinkable olefin type copolymer rubber in the sample, that is, the weight obtained by subtracting (1) the cyclohexane-soluble components (for example, the mineral oil and the plasticizer) other than the peroxide-crosslinkable olefin type copolymer, (2) the olefin type plastic component and (3) the cyclohexane-insoluble components (the fibrous filler, the filler, the pigment and the like) other than the polymer component from the weight of the sample is designated as "corrected initial weight (X)".

The gel content is calculated according to the following formula:

Gel content (% by weight) = [corrected final weight $(Y)$]/[corrected initial weight $(X)$] × 100

Effects of the Invention

The thermoplastic resin or elastomer of the present invention is obtained by blending the above-mentioned components at a specific ratio and dynamically heat-treating the blend in the presence of an organic peroxide, and the composition is excellent in mechanical characteristics, moldability, paint adhesion and bondability to resins and metals. The thermoplastic resin or elastomer composition can be molded by an ordinary molding apparatus for thermoplastic resins and especially, the composition can be easily molded by extrusion molding, calender molding, injection molding or the like.

The thermoplastic resin or elastomer composition of the present invention is excellent in rubbery characteristics, moldability, paint adhesion, bondability to resins and metals, mechanical strength, heat resistance and softness, and the composition can be molded by a known molding apparatus for ordinary thermoplastic plastics and is especially suitable for extrusion molding, calender molding or injection molding. These excellent characteristics are attained by synergistic actions of the respective components. The paint adhesion and the bondability to resins or metals are especially improved by incorporation of the components (c) and (d), and the composition is preferably used for non-primer coating of a molded article, production of laminates and coating of metals. These effects will become apparent from the examples given hereinafter.

Furthermore, the laminate of the present invention is lighter in the weight than soft polyvinyl chloride or the like, and the stickiness caused by a plasticizer is prevented and excellent heat resistance and dimension stability are attained. Accordingly, the laminate of the present invention can be effectively used for interior automotive trims, sealing materials, furniture, construction materials, housings of household electric appliances, bags, sport goods and office supplies.

The present invention will now be described in detail with reference to the following examples that by no means limit the scope of the invention.

Incidentally, molding conditions adopted in the examples for obtaining test samples from the resin and elastomers prepared in the examples and methods for testing the samples are described below.

(1) Injection molding
 Molding machine: Dina Melter (supplied by Meiki Seisakusho)
 Injection pressure: 1000 kg/cm$^2$ (primary pressure), 700 kg/cm$^2$ (secondary pressure)
 Molding temperature: 220° C.
 Injection speed: maximum
 Molding speed: 90 sec/cycle
 Gate: direct gate (land length=10 mm, width=10 mm, thickness=3 mm)
 Molded article: length=150 mm, width=120 mm, thickness=3 mm (2) Injection molding
 T-die sheets were extrusion-molded under following conditions.
 Molding machine: 40 mm-diameter extruder (supplied by Toshiba Kikai)
 Screw: full-flight type, L/D=28, CR=3.5
 Screen bag: two 80-mesh bags
 Molding temperature: 160° C. on hopper side, 210° C. on die side
 Die: coat hanger type
 Die lip: 1.5 mm
 Take-out speed: 5 m/min (3) Basic properties
 A. Thermoplastic resin
 A test piece was punched out from a square board having a thickness of 2 mm, which was obtained by injection molding according to the method described in (1), and the basic pro-properties were determined according to the following methods.
  Melt flow rate: measured according to the method of ASTM D-1238.
  Stress at yield point, tensile force at break and elongation at break: measured according to the method of ASTM D-638.
  Initial flexural modulus: measured according to the method of ASTM D-790.
 B. Thermoplastic elastomer
 A test piece was punched out from a square board having a thickness of 3 mm, which was obtained by injection molding described in (1) above, and the basic properties were measured according to the following methods.
  Tensile characteristics: the stress (M100) at elongation of 100%, the tensile strength (Tb) and the elongation (Eb) at break were measured according to the method of JIS K-6301.
  Spring hardness (Hs): measured by method A of JIS K-6301 and Shore D method of ASTM D-2240.
  Initial flexural modulus (FM): measured according to method of ASTM D-790.
  Permanent set (PS): the residual elongation at 100% elongation was measured according to method of JIS K-6301.
  Softening point (SP): the temperature at which a needle having a diameter of 0.8 mm penetrated in 0.1 mm in the sample was measured at a temperature-elevating rate of 20° C./min under a load of 49 g by TMA measuring apparatus supplied by du Pont.

(4) Peeling strength of coating
 A. Preparation of sample
 A urethane paint (polyol-isocyanate two-liquid type urethane paint) (R-271 supplied by Nippon Paint) was coated in a thickness of 35 to 40 μm on a molded article of the thermoplastic resin or elastomer composition of the present invention.
 B. Peeling test
  Test piece: strip having a width of 25 mm and a length of 100 mm
  Test method: 180° peeling
  Pulling speed: 25 mm/min
  Bonding strength: value (kg/cm) obtained by dividing the peeling load by the width of the test piece (breaking of the base material is indicated by "breaking of base").

(5) Bonding strength
 A. Preparation of test piece
 An extrusion sheet (having a thickness of 1.0 mm) formed from the elastomer composition under the conditions described in (2) above was press-molded to an adherend having a thickness of 0.5 mm (mold-clamping pressure=5 tons) to obtain a test piece having a size of 150 mm×150 mm. The following adherends were used.
  Nylon: nylon 6 (Amilan CM1021 supplied by Toray)
  Polyurethane: P26 SRNAT supplied by Nippon Polyurethane Steel sheet: SS-41 supplied by Nippon Test Panel (treated by sand blast having a surface roughness of 30 microns)

B. Peeling test

Test piece: strip having a width of 25 mm and a length of 100 mm

Test method: 180° C. peeling

Pulling speed: 25 mm/min

Bonding strength: value (kg/cm) obtained by dividing the peeling load by the width of the test piece (breaking of the base material is indicated by "breaking of base")

In the present invention, the content ratio between the components (a) and (b) in the thermoplastic resin or elastomer composition can be determined by the DSC method and/or the infrared adsorption analysis method. The contents of the components (e) and (f) in the composition can be determined by the solvent extraction method (Soxhlet extraction method using acetone as the solvent) and/or the infrared adsorption analysis method. The content between the component (g) and the organic components can be determined by the thermogravimetric analysis method.

The contents of the grafted components (c) and (d) can be determined by the infrared adsorption analysis method or the chemical analysis method.

(6) Physical properties of sheets of thermoplastic elastomers for laminates

The physical properties of sheets obtained from elastomers obtained in Examples 170 through 179 by compression molding at 190° C. were determined according to the following methods.

Strength: the tensile strength (Tg, kgf/cm$^2$) at break was measured at a pulling speed of 200 mm/min according to the method of JIS K-6301.

Softness: the torsion stiffness (kgf/cm$^2$) was measured according to the method of ASTM D-1043.

Moldability: the melt flow rate (MFR) (g/10 min) was measured at 230° C. under a load of 2.16 kg according to the method of ASTM D-1238.

EXAMPLE 1

In a nitrogen atmosphere, 70 parts by weight of an ethylene/propylene/5-ethylidene-2-norbornene copolymer rubber [ethylene content=70 mole %, iodine value=15, Mooney viscosity $ML_{1+4}$ (100° C.)=120; hereinafter referred to as "EPDM(1)"] was kneaded with 30 parts by weight of polypropylene [melt flow rate (ASTM D-1238-65T, 230° C.)=13, density=0.91 g/cm$^3$; hereinafter referred to as "PP"] at 190° C. for 5 minutes by a Banbury mixer, and the kneaded mixture was passed through rolls and formed into a square pellet by a sheet cutter.

Then, the obtained square pellet was mixed and stirred with 0.5 part by weight of maleic anhydride (hereinafter referred to as "MAH"), 0.5 part by weight of divinylbenzene (hereinafter referred to as "DVB") and 0.3 part by weight of 1,3-bis(t-butylperoxyisopropyl)benzene [hereinafter referred to as "peroxide (A)"] by a Henschel mixer, and this pellet was extruded at 220° C. in a nitrogen atmosphere by an extruder to obtain a thermoplastic elastomer composition.

The square pellet of the above composition was mixed and stirred with 1.0 part by weight of N-aminoethylethanolamine (hereinafter referred to as "AEA") by a Henschel mixer and the pellet was extruded at 220° C. in a nitrogen atmosphere by an extruder to obtain a thermoplastic elastomer composition.

The physical properties, coating peeling strength and bonding strength of the obtained composition were measured. The obtained results as well as results obtained in the subsequent examples and comparative examples are shown in Table 1.

EXAMPLES 2 THROUGH 5

Thermoplastic elastomers were prepared in the same manner as described in Example 1 except that the amount incorporated of MAH, AEA, DVB and peroxide (A) were changed.

EXAMPLE 6

A thermoplastic elastomer was prepared in the same manner as described in Example 1 except that 1.0 part by weight of diethylene triamine (hereinafter referred to as "DET") was used instead of AEA.

EXAMPLE 7

A thermoplastic elastomer was prepared in the same manner as described in Example 1 except that 1.0 part by weight of triethylene tetramine (hereinafter referred to as "TET") was used instead of AEA.

EXAMPLE 8

A thermoplastic elastomer was prepared in the same manner as described in Example 1 except that 1.0 part by weight of 2-aminoethanol (hereinafter referred to as "AE") was used instead of AEA.

COMPARATIVE EXAMPLE 1

A thermoplastic elastomer was prepared in the same manner as described in Example 1 except that MAH and AEA were not incorporated.

EXAMPLES 9 THROUGH 12 AND COMPARATIVE EXAMPLE 2

A thermoplastic elastomer was prepared in the same manner as described in Example 1 except that the amounts incorporated of the respective components were changed.

EXAMPLE 13

A blend was prepared by stirring 70 parts by weight of a pelletized ethylene/propylene/5-ethylidene-2-norbornene copolymer rubber [ethylene content=70 mole %, iodine value=10, Mooney viscosity $ML_{1+4}$ (100° C.)=70, extended oil amount=20 parts by weight (accordingly, the amount of the rubber rubber component was 50 parts by weight); hereinafter referred to as "EPDM (2)"], 50 parts by weight of PP, 0.5 part by weight of MAH, 0.5 part by weight of DVB and 0.3 part by weight of peroxide (A) by a Henschel mixer.

The blend was extruded at 220° C. in a nitrogen atmosphere by using a twin-screw extruder having an L/D ratio of 44 and a screw diameter of 53 mm to prepare a thermoplastic elastomer composition.

The square pellet of the composition was stirred with 1.0 part of AEA by a Henschel mixer to prepare a blend. The blend was extruded in a nitrogen atmosphere at 220° C. by using a twin-screw extruder having an L/D ratio of 44 and a screw diameter of 53 mm to prepare a thermoplastic elastomer.

The basic physical properties, coating peeling strength and bonding strength were measured. The obtained results as well as results obtained in the subsequent examples and comparative Examples are shown in Table 2.

EXAMPLES 14 THROUGH 17 AND COMPARATIVE EXAMPLE 3

Thermoplastic elastomers were prepared in the same manner as described in Example 13 except that the amounts incorporated of the respective components were changed.

EXAMPLE 18

A square pellet was prepared in the same manner as described in Example 1 from 70 parts by weight of EPDM (1), 30 parts by weight of PP, 10 parts by weight of a butyl rubber IIR-065 supplied by Esso, unsaturation degree=0.8%; hereinafter referred to as "IIR") and 30 parts by weight of a paraffinic process oil (hereinafter referred to as "oil"). In the same manner as described in Example 1, a thermoplastic elastomer composition was prepared from the obtained square pellet, 0.5 part by weight of MAH, 0.5 part by weight of DVB and 0.3 part by weight of peroxide (A).

A thermoplastic elastomer composition was prepared from the square pellet of the above composition and 1.0 part by weight of AEA in the same manner as described in Example 1.

The physical properties, coating peeling strength and bonding strength of the obtained composition were measured. The obtained results as well as results obtained in the subsequent examples and comparative examples are shown in Table 3.

EXAMPLES 19 THROUGH 22

Thermoplastic elastomer compositions were prepared in the same manner as described in Example 18 except that the amounts incorporated of MAH, AEA, DVB and peroxide (A) were changed.

EXAMPLE 23

A thermoplastic elastomer composition was prepared in the same manner as described in Example 18 except that 1.0 part by weight of DET was used instead of AEA.

EXAMPLE 24

A thermoplastic elastomer composition was prepared in the same manner as described in Example 18 except that 1.0 part by weight of TET was used instead of AEA.

EXAMPLE 25

A thermoplastic elastomer composition was prepared in the same manner as described in Example 18 except that 1.0 part by weight of AE was used instead of AEA.

COMPARATIVE EXAMPLE 4

A thermoplastic elastomer composition was prepared in the same manner as described in Example 18 except that MAH and AEA were not incorporated.

EXAMPLES 26 THROUGH 34

Thermoplastic elastomer compositions were prepared in the same manner as described in Example 18 except that the amounts incorporated of the components were changed as shown in Table 3.

EXAMPLE 35

In a nitrogen atmosphere, 20 parts by weight of EPDM (1), 60 parts by weight of PP, 10 parts by weight of IIR, 10 parts by weight of the oil and 5 parts by weight of a milled glass fiber [Microglass Milled Fiber RX-EMFP supplied by Nippon Sheet Glass, fiber diameter=11 μm, average fiber length=240 μm; hereinafter referred to as "milled glass fiber")] were kneaded at 190° C. for 5 minutes, and the kneaded mixture was passed through rolls and formed into a square pellet by a sheet cutter (first step).

Then, 100 parts by weight of the pellet was mixed and stirred with 0.3 part by weight of peroxide (A), 0.5 part by weight of DVB and 0.5 part by weight of MAH by a Henschel mixer.

Then, the pellet was extruded at 220° C. in a nitrogen atmosphere by an extruder (second step).

Then, 100 parts by weight of the square pellet of the above composition and 1 part by weight of AEA were formed into a thermoplastic elastomer composition in the same manner as described in Example 1 (third step).

The physical properties, coating peeling strength and bonding strength of the obtained composition were measured. The obtained results as well as results obtained in the subsequent examples and comparative examples are shown in Table 4.

EXAMPLES 36 THROUGH 41

Thermoplastic elastomer compositions were prepared in the same manner as described in Example 35 except that the kind and amount of the filler were changed as shown in Table 4. The following fillers were used.

Glass Flake

A scaly filmy glass in which the content of a fraction passing through a 325-mesh sieve is at least 88% and which has a thickness of 3 μm Microglass Flake EF325 supplied by Nippon Sheet Glass; hereinafter referred to as "glass flake".

Potassium Titanate Fiber

A potassium titanate fiber having a fiber diameter of 0.2 to 0.5 μm and an average fiber length of 10 to 20 μm (Tisno D supplied by Otsuka Kagaku Yakuhin; hereinafter referred to as "potassium titanate").

COMPARATIVE EXAMPLE 5

A thermoplastic composition was prepared in the same manner as described in Example 35 except that MAH was not added at the second step and AEA was not added at the third step.

EXAMPLES 42 THROUGH 46

Thermoplastic elastomer compositions were prepared in the same as described in Example 35 except that the amounts incorporated of MAH, AEA, DVB and peroxide (A) were changed.

EXAMPLE 47

A thermoplastic elastomer composition was prepared in the same manner as described in Example 35 except that the filler was not added at the first step.

EXAMPLE 48

A composition comprising 50 parts by weight of a pelletized ethylene/propylene/5-ethylidene-2-norbornene copolymer rubber [ethylene content=78 mole %, iodine value of 10, Mooney viscosity $ML_{1+4}$ (100° C.)=160, amount of extended oil=30 parts by weight (accordingly, the amount of the oil component was 15 parts by weight); hereinafter referred to as "EPDM (3)"], 50 parts by weight of PP, 0.5 part by weight of MAH, 0.5 part by weight of DVB and 0.3 part by weight of 2,5-dimethyl-2,5-(tert-butylperoxy)hexine-3 (hereinafter referred to as "peroxide (B)") was stirred and mixed by a Henschel mixer.

The mixture was extruded in a nitrogen atmosphere at 230° C. by a twin-screw extruder supplied by Werner and Pfleiderer (L/D=43, intermeshing type, rotation in the same direction, three-thread type screw) (first step).

Then, 100 parts by weight of the square pellet of the above composition was stirred with 1.0 part by weight by a Henschel mixer to prepare a blend, and the blend was extruded at 230° C. in a nitrogen atmosphere by a twin-screw extruder (second step).

Then, 100 parts by weight of the above pellet was kneaded with 5 parts by weight of the milled glass fiber in a nitrogen atmosphere at 200° C. for 5 minutes by a Banbury mixer, and the kneaded mixture was passed through rolls and formed into a square pellet by a sheet cutter (third step).

EXAMPLES 49 through 54

The procedures of Example 48 were repeated in the same manner except that the kind and amount of the filler were changed as shown in Table 5 at the third step.

EXAMPLES 55 THROUGH 59

Thermoplastic elastomer compositions were prepared in the same manner as described in Example 48 except that the amounts of MAH, AEA, DVB and peroxide (B) were changed.

COMPARATIVE EXAMPLE 6

The procedures of Example 48 were repeated in the same manner except that MAH was not added at the first step and AEA was not added at the second step.

EXAMPLE 60

The procedures of Example 48 were repeated in the same manner except that the filler was not added at the third step.

The physical properties of the compositions obtained in Examples 48 through 60 and Comparative Example 6 are shown in Table 5.

EXAMPLE 61

A mixture was prepared by stirring 70 parts by weight of EPDM (3), 30 parts by weight of PP, 0.5 part by weight of MAH, 0.5 part by weight of DVB and 0.3 part by weight of peroxide (B) by a Henschel mixer, and the mixture was extruded at 220° C. in a nitrogen atmosphere by a twin-screw extruder (first step).

Then, 100 parts by weight of the obtained square pellet of the above composition was kneaded with 5 parts by weight of the milled glass fiber at 200° C. for 5 minutes in a nitrogen atmosphere by a Banbury mixer, and the mixture was passed through rolls and a square pellet was formed by a sheet cutter (second step).

Then, 100 parts by weight of the obtained square pellet of the above composition was stirred with 1.0 part by weight of AEA by a Henschel mixer, and the formed blend was extruded at 230° C. in a nitrogen atmosphere by a twin-screw extruder (third step).

EXAMPLES 62 THROUGH 67

The procedures of Example 61 were repeated in the same manner except that the kind and amount of the filler were changed as shown in Table 6 at the third step.

EXAMPLES 68 THROUGH 72

The procedures of Example 61 were repeated in the same manner except that the amount incorporated of MAH, AEA, DVB and peroxide (B) were changed.

COMPARATIVE EXAMPLE 7

The procedures of Example 61 were repeated in the same manner except that MAH was not added at the first step and AEA was not added at the second step.

EXAMPLE 73

The procedures of Example 61 were repeated in the same manner except that the filler was not added at the third step.

The physical properties of the compositions obtained in Examples 61 through 73 and Comparative Example 7 are shown in Table 6.

TABLE 1

| | | E1 | E2 | E3 | E4 | E5 | E6 | E7 | E8 | R1 | E9 | E10 | E11 | E12 | R2 |
|---|---|---|---|---|---|---|---|---|---|---|---|---|---|---|---|
| Composition | | | | | | | | | | | | | | | |
| first step | EPDM (1) | 70 | 70 | 70 | 70 | 70 | 70 | 70 | 70 | 70 | 30 | 30 | 30 | 30 | 30 |
| | PP | 30 | 30 | 30 | 30 | 30 | 30 | 30 | 30 | 30 | 70 | 70 | 70 | 70 | 70 |
| | MAH | 0.5 | 0.3 | 1.0 | 2.0 | 3.0 | 0.5 | 0.5 | 0.5 | — | 0.5 | 0.5 | 0.5 | 0.5 | — |
| | DVB | 0.5 | 0.4 | 0.7 | 0.8 | 0.9 | 0.5 | 0.5 | 0.5 | 0.5 | 0.5 | 0.5 | 0.5 | 0.5 | 0.5 |
| | peroxide (A) | 0.3 | 0.2 | 0.5 | 0.6 | 0.7 | 0.3 | 0.3 | 0.3 | 0.3 | 0.3 | 0.3 | 0.3 | 0.3 | 0.3 |
| second step | AEA | 1.0 | 0.6 | 1.5 | 3.0 | 4.5 | — | — | — | — | 1.0 | — | — | — | — |
| | DET | — | — | — | — | — | 1.0 | — | — | — | — | 1.0 | — | — | — |
| | TET | — | — | — | — | — | — | 1.0 | — | — | — | — | 1.0 | — | — |
| | AE | — | — | — | — | — | — | — | 1.0 | — | — | — | — | 1.0 | — |
| Basic physical Properties | | | | | | | | | | | | | | | |
| $M_{100}$ (kgf/cm$^2$) | | 45 | 43 | 45 | 45 | 42 | 42 | 43 | 43 | 41 | 115 | 116 | 116 | 115 | 117 |
| $T_B$ (kgf/cm$^2$) | | 100 | 99 | 105 | 107 | 101 | 103 | 101 | 102 | 99 | 219 | 220 | 223 | 225 | 230 |
| $E_B$ (%) | | 580 | 583 | 587 | 588 | 581 | 579 | 588 | 575 | 577 | 640 | 642 | 645 | 645 | 637 |
| $H_s$ JIS A | | 82 | 81 | 81 | 82 | 80 | 82 | 81 | 80 | 81 | — | — | — | — | — |
| Shore D hardness | | — | — | — | — | — | — | — | — | — | 53 | 54 | 54 | 54 | 54 |
| $P_s$ (%) | | 19 | 19 | 18 | 20 | 21 | 20 | 19 | 19 | 20 | — | — | — | — | — |
| FM (kgf/cm$^2$) | | — | — | — | — | — | — | — | — | — | 6200 | 6200 | 6200 | 6200 | 6200 |
| SP (°C.) | | 138 | 139 | 138 | 140 | 139 | 138 | 138 | 137 | 137 | 150 | 151 | 150 | 149 | 151 |
| Gel content | | 96 | 95 | 97 | 97 | 97 | 96 | 96 | 97 | 96 | 47 | 47 | 46 | 47 | 48 |
| Bonding Strength | | | | | | | | | | | | | | | |
| peeling strength to urethane (g/cm) | | 950 | 900 | 1000 | 1020 | 990 | 900 | 910 | 900 | below 0.1 | 955 | 910 | 925 | 910 | below 0.1 |
| bonding strength to nylon (kg/cm) | | 8.0 | 7.0 | 8.5 | * | * | 7.9 | 8.0 | 8.1 | below 0.1 | 8.5 | 8.2 | 8.2 | 8.1 | below 0.1 |
| bonding strength to | | 1.3 | 1.1 | 1.2 | 1.3 | 1.1 | 1.2 | 1.2 | 1.1 | below | 1.3 | 1.2 | 1.2 | 1.3 | below |

TABLE 1-continued

|  | E1 | E2 | E3 | E4 | E5 | E6 | E7 | E8 | R1 | E9 | E10 | E11 | E12 | R2 |
|---|---|---|---|---|---|---|---|---|---|---|---|---|---|---|
| polyurethane (kg/cm) bonding strength to steel sheet (kg/cm) | 8.3 | 8.1 | 8.3 | * | * | 8.1 | 8.1 | 8.0 | 0.1 below 0.1 | 8.0 | 8.1 | 8.3 | 8.1 | 0.1 below 0.1 |

E: Example
R: Comparative Example
*breaking of substrate

TABLE 2

|  | E13 | E14 | E15 | E16 | E17 | R3 |
|---|---|---|---|---|---|---|
| Composition |  |  |  |  |  |  |
| first step |  |  |  |  |  |  |
| EPDM (2) | 70*1 | 70*1 | 70*1 | 70*1 | 70*1 | 70*1 |
| PP | 50 | 50 | 50 | 50 | 50 | 50 |
| MAH | 0.5 | 0.3 | 1.0 | 2.0 | 3.0 | — |
| DVB | 0.5 | 0.4 | 0.7 | 0.8 | 0.9 | 0.5 |
| peroxide (A) | 0.3 | 0.4 | 0.7 | 0.8 | 0.9 | 0.3 |
| second step |  |  |  |  |  |  |
| AEA | 1.0 | 0.5 | 1.5 | 3.0 | 4.5 | — |
| Basic physical Properties |  |  |  |  |  |  |
| $M_{100}$ (kgf/cm$^2$) | 71 | 70 | 72 | 72 | 71 | 71 |
| $T_B$ (kgf/cm$^2$) | 153 | 152 | 154 | 155 | 152 | 151 |
| $E_B$ (%) | 630 | 620 | 630 | 635 | 630 | 635 |
| $H_s$ JIS A | — | — | — | — | — | — |
| Shore D hardness | 38 | 37 | 38 | 38 | 38 | 37 |
| $P_s$ (%) | — | — | — | — | — | — |
| FM (kgf/cm$^2$) | 2500 | 2500 | 2600 | 2600 | 2600 | 2500 |
| SP (°C.) | 146 | 145 | 147 | 147 | 147 | 146 |
| Gel content | 62 | 61 | 62 | 60 | 61 | 62 |
| Bonding Strength |  |  |  |  |  |  |
| peeling strength to urethane (g/cm) | 940 | 920 | 990 | 990 | 990 | below 0.1 |
| bonding strength to nylon (kg/cm) | 8.0 | 7.8 | 8.1 | 8.1 | 8.2 | below 0.1 |
| bonding strength to polyurethane (kg/cm) | 1.2 | 1.1 | 1.2 | 1.2 | 1.2 | below 0.1 |
| bonding strength to steel sheet (kg/cm) | 8.1 | 8.0 | 8.1 | 8.1 | 8.2 | below 0.1 |

*1: extended oil amount was 20 parts by weight and the amount of EPDM was 50 parts by weight.

TABLE 3

|  | E18 | E19 | E20 | E21 | E22 | E23 | E24 | E25 | R4 | E26 | E27 | E28 | E29 | E30 | E31 | E32 | E33 | E34 |
|---|---|---|---|---|---|---|---|---|---|---|---|---|---|---|---|---|---|---|
| Composition |  |  |  |  |  |  |  |  |  |  |  |  |  |  |  |  |  |  |
| first step |  |  |  |  |  |  |  |  |  |  |  |  |  |  |  |  |  |  |
| EPDM (1) | 70 | 70 | 70 | 70 | 70 | 70 | 70 | 70 | 70 | 70 | 70 | 70 | 50 | 50 | 50 | 50 | 50 | 50 |
| PP | 30 | 30 | 30 | 30 | 30 | 30 | 30 | 30 | 30 | 30 | 30 | 30 | 50 | 50 | 50 | 50 | 50 | 50 |
| IIR | 10 | 10 | 10 | 10 | 10 | 10 | 10 | 10 | 10 | 10*2 | 10 | — | 30 | 50 | 50 | 10 | 10 | 10 |
| oil | 30 | 30 | 30 | 30 | 30 | 30 | 30 | 30 | 30 | 30 | — | 30 | 10 | 10 | 80 | 10 | 50 | 70 |
| MAH | 0.5 | 0.3 | 1.0 | 2.0 | 3.0 | 0.5 | 0.5 | 0.5 | — | 0.5 | 0.5 | 0.5 | 0.5 | 0.5 | 0.5 | 0.5 | 0.5 | 0.5 |
| DVB | 0.5 | 0.4 | 0.7 | 0.8 | 0.9 | 0.5 | 0.5 | 0.5 | 0.5 | 0.5 | 0.5 | 0.5 | 0.5 | 0.5 | 0.5 | 0.5 | 0.5 | 0.5 |
| peroxide (A) | 0.3 | 0.2 | 0.5 | 0.6 | 0.7 | 0.3 | 0.3 | 0.3 | 0.3 | 0.3 | 0.3 | 0.3 | 0.3 | 0.3 | 0.3 | 0.3 | 0.3 | 0.3 |
| second step |  |  |  |  |  |  |  |  |  |  |  |  |  |  |  |  |  |  |
| AEA | 1.0 | 0.6 | 1.5 | 3.0 | 4.5 | — | — | — | — | 1.0 | 1.0 | 1.0 | 1.0 | 1.0 | 1.0 | 1.0 | 1.0 | 1.0 |
| DET | — | — | — | — | — | 1.0 | — | — | — | — | — | — | — | — | — | — | — | — |
| TET | — | — | — | — | — | — | 1.0 | — | — | — | — | — | — | — | — | — | — | — |
| AE | — | — | — | — | — | — | — | 1.0 | — | — | — | — | — | — | — | — | — | — |
| Basic physical Properties |  |  |  |  |  |  |  |  |  |  |  |  |  |  |  |  |  |  |
| $M_{100}$ (kgf/cm$^2$) | 26 | 26 | 27 | 27 | 27 | 26 | 25 | 26 | 25 | 23 | 35 | 32 | 55 | 24 | 22 | 62 | 25 | 21 |
| $T_B$ (kgf/cm$^2$) | 80 | 81 | 82 | 81 | 81 | 80 | 80 | 79 | 78 | 80 | 99 | 91 | 135 | 73 | 70 | 140 | 76 | 69 |
| $E_B$ (%) | 630 | 620 | 620 | 600 | 600 | 610 | 600 | 610 | 600 | 620 | 540 | 590 | 560 | 645 | 650 | 610 | 650 | 660 |
| $H_s$ JIS A | 65 | 64 | 64 | 65 | 64 | 65 | 65 | 65 | 64 | 65 | 77 | 71 | 82 | 65 | 61 | 83 | 65 | 79 |
| $P_s$ (%) | 9 | 8 | 9 | 10 | 10 | 9 | 9 | 9 | 11 | 9 | 15 | 12 | 26 | 13 | 13 | 22 | 12 | 11 |
| SP (°C.) | 120 | 121 | 120 | 119 | 120 | 119 | 120 | 120 | 120 | 121 | 130 | 127 | 136 | 115 | 114 | 116 | 115 | 115 |
| Gel content | 96 | 96 | 97 | 96 | 96 | 96 | 96 | 96 | 93 | 96 | 96 | 97 | 94 | 96 | 95 | 94 | 94 | 91 |
| Bonding Strength |  |  |  |  |  |  |  |  |  |  |  |  |  |  |  |  |  |  |
| peeling strength to urethane strength (g/cm) | 940 | 930 | 945 | 950 | 950 | 900 | 910 | 900 | below 0.1 | 930 | 930 | 920 | 925 | 930 | 920 | 910 | 910 | 930 |
| bonding strength to nylon (kg/cm) | 7.5 | 7.1 | 7.3 | * | * | 7.2 | 7.1 | 7.2 | below 0.1 | 7.4 | 7.3 | 7.4 | * | * | 7.1 | * | * | * |
| bonding strength to polyurethane (kg/cm) | 1.4 | 1.4 | 1.4 | 1.5 | 1.6 | 1.5 | 1.4 | 1.4 | below 0.1 | 1.4 | 1.1 | 1.1 | 1.2 | 1.1 | 1.3 | 1.1 | 1.1 | 1.4 |
| bonding to steel sheet (kg/cm) | 7.6 | 7.5 | 7.7 | * | * | 7.6 | 7.6 | 7.5 | below 0.1 | 7.6 | 7.4 | 7.1 | * | * | 7.5 | 7.1 | * | * |

*2: PIB (polyisobutylene) was used.
*breaking of substrate

TABLE 4

|  | E35 | E36 | E37 | E38 | E39 | E40 | E41 | R5 | E42 | E43 | E44 | E45 | E46 | E47 |
|---|---|---|---|---|---|---|---|---|---|---|---|---|---|---|
| Composition |  |  |  |  |  |  |  |  |  |  |  |  |  |  |
| first step |  |  |  |  |  |  |  |  |  |  |  |  |  |  |
| EPDM (1) | 20 | 20 | 20 | 20 | 20 | 20 | 20 | 20 | 20 | 20 | 20 | 20 | 20 | 20 |

TABLE 4-continued

|  | E35 | E36 | E37 | E38 | E39 | E40 | E41 | R5 | E42 | E43 | E44 | E45 | E46 | E47 |
|---|---|---|---|---|---|---|---|---|---|---|---|---|---|---|
| PP | 60 | 60 | 60 | 60 | 60 | 60 | 60 | 60 | 60 | 60 | 60 | 60 | 60 | 60 |
| oil | 10 | 10 | 10 | 10 | 10 | 10 | 10 | 10 | 10 | 10 | 10 | 10 | 10 | 10 |
| IIR | 10 | 10 | 10 | 10 | 10 | 10 | 10 | 10 | 10 | 10 | 10 | 10 | 10 | 10 |
| milled glass fiber | 5 | 15 | 25 | — | — | — | — | 5 | 5 | 5 | 5 | 5 | 5 | — |
| glass flake | — | — | — | 15 | — | — | — | — | — | — | — | — | — | — |
| potassium titanate fiber | — | — | — | — | 5 | 15 | 25 | — | — | — | — | — | — | — |
| second step |  |  |  |  |  |  |  |  |  |  |  |  |  |  |
| elastomer obtained at first step | 100 | 100 | 100 | 100 | 100 | 100 | 100 | 100 | 100 | 100 | 100 | 100 | 100 | 100 |
| MAH | 0.5 | 0.5 | 0.5 | 0.5 | 0.5 | 0.5 | 0.5 | — | 0.3 | 1.0 | 2.0 | 3.0 | 1.0 | 0.5 |
| DVB | 0.5 | 0.5 | 0.5 | 0.5 | 0.5 | 0.5 | 0.5 | 0.5 | 0.4 | 0.7 | 0.8 | 0.9 | 0.7 | 0.5 |
| peroxide (A) | 0.3 | 0.3 | 0.3 | 0.3 | 0.3 | 0.3 | 0.3 | 0.3 | 0.2 | 0.5 | 0.6 | 0.7 | 0.5 | 0.3 |
| third step |  |  |  |  |  |  |  |  |  |  |  |  |  |  |
| AEA | 1.0 | 1.0 | 1.0 | 1.0 | 1.0 | 1.0 | 1.0 | — | 0.6 | 1.5 | 3.0 | 4.5 | 0.5 | 1.0 |
| Basic Physical Properties |  |  |  |  |  |  |  |  |  |  |  |  |  |  |
| $M_{100}$ (kgf/cm$^2$) | 115 | 145 | 190 | 120 | 115 | 137 | 172 | 118 | 115 | 119 | 119 | 123 | 121 | 105 |
| $T_B$ (kgf/cm$^2$) | 205 | 249 | 278 | 221 | 210 | 240 | 263 | 205 | 204 | 207 | 207 | 209 | 205 | 190 |
| $E_B$ (%) | 620 | 540 | 510 | 507 | 610 | 550 | 515 | 620 | 620 | 618 | 625 | 627 | 618 | 630 |
| $H_s$ shore D hardness | 50 | 53 | 57 | 51 | 50 | 51 | 55 | 50 | 51 | 51 | 52 | 51 | 50 | 50 |
| gel content | 47 | 47 | 46 | 47 | 47 | 46 | 47 | 47 | 46 | 47 | 47 | 48 | 46 | 47 |
| Peeling Strength to Urethane Coating (g/cm) | 850 | 840 | 810 | 840 | 860 | 835 | 800 | below | 840 | 855 | 877 | 940 | 860 | 860 |
| Other Physical Properties |  |  |  |  |  |  |  |  |  |  |  |  |  |  |
| heat resistance: heat sag (120° C.)(mm) | 5 | 3 | 2 | 6 | 5 | 3 | 2 | 9 | 5 | 5 | 5 | 5 | 6 | 12 |
| cold resistance: Izod impact strength (−20° C.)(kg · cm/cm) | NB | NB | NB | NB | NB | NB | NB | NB | NB | NB | NB | NB | NB | NB |
| shape stability: initial flexural strength (kgf/cm$^2$) | 4500 | 5100 | 5500 | 4800 | 4600 | 5000 | 5400 | 4400 | 4500 | 4500 | 4500 | 4500 | 4700 | 4100 |
| dimension stability: linear expansion coefficient ($\times 10^{-6}$)(mm/mm/°C.) | 100 | 80 | 60 | 100 | 110 | 70 | 60 | 130 | 100 | 100 | 100 | 100 | 90 | 160 |

NB: not broken

TABLE 5

|  | E48 | E49 | E50 | E51 | E52 | E53 | E54 | E55 | E56 | E57 | E58 | E59 | R6 | E60 |
|---|---|---|---|---|---|---|---|---|---|---|---|---|---|---|
| Composition |  |  |  |  |  |  |  |  |  |  |  |  |  |  |
| first step |  |  |  |  |  |  |  |  |  |  |  |  |  |  |
| EPDM (3) | 50 | 50 | 50 | 50 | 50 | 50 | 50 | 50 | 50 | 50 | 50 | 50 | 50 | 50 |
| PP | 50 | 50 | 50 | 50 | 50 | 50 | 50 | 50 | 50 | 50 | 50 | 50 | 50 | 50 |
| MAH | 0.5 | 0.5 | 0.5 | 0.5 | 0.5 | 0.5 | 0.5 | 0.3 | 1.0 | 2.0 | 3.0 | 1.0 | — | 0.5 |
| DVB | 0.5 | 0.5 | 0.5 | 0.5 | 0.5 | 0.5 | 0.5 | 0.4 | 0.7 | 0.8 | 0.9 | 0.7 | 0.5 | 0.5 |
| peroxide (B) | 0.3 | 0.3 | 0.3 | 0.3 | 0.3 | 0.3 | 0.3 | 0.2 | 0.5 | 0.6 | 0.7 | 0.5 | 0.3 | 0.3 |
| second step |  |  |  |  |  |  |  |  |  |  |  |  |  |  |
| AEA | 1.0 | 1.0 | 1.0 | 1.0 | 1.0 | 1.0 | 1.0 | 0.6 | 1.5 | 3.0 | 4.5 | 0.5 | — | 1.0 |
| third step |  |  |  |  |  |  |  |  |  |  |  |  |  |  |
| elastomer obtained at second step | 100 | 100 | 100 | 100 | 100 | 100 | 100 | 100 | 100 | 100 | 100 | 100 | 100 | 100 |
| milled glass fiber | 5 | 10 | 15 | — | — | — | — | 5 | 5 | 5 | 5 | 5 | 5 | — |
| glass flake | — | — | — | 10 | — | — | — | — | — | — | — | — | — | — |
| porassium titanate fiber | — | — | — | — | 10 | 20 | 30 | — | — | — | — | — | — | — |
| Basic Physical Properties |  |  |  |  |  |  |  |  |  |  |  |  |  |  |
| $M_{100}$ (kgf/cm$^2$) | 87 | 97 | 105 | 85 | 90 | 108 | 135 | 87 | 88 | 85 | 86 | 87 | 95 | 80 |
| $T_B$ (kgf/cm$^2$) | 175 | 186 | 212 | 172 | 185 | 225 | 260 | 174 | 177 | 176 | 175 | 172 | 110 | 170 |
| $E_B$ (%) | 560 | 510 | 490 | 490 | 510 | 470 | 425 | 565 | 560 | 575 | 568 | 560 | 210 | 590 |
| $H_s$ shore D hardness | 43 | 44 | 47 | 44 | 43 | 46 | 47 | 44 | 43 | 44 | 44 | 43 | 43 | 44 |
| gel content | 56 | 55 | 56 | 56 | 55 | 56 | 56 | 55 | 56 | 56 | 56 | 56 | 55 | 55 |
| Peeling Strength to Urethane Coating (g/cm) | 890 | 870 | 830 | 875 | 895 | 890 | 820 | 860 | 900 | 910 | 950 | 990 | below 0.1 | 950 |
| Other Physical Properties |  |  |  |  |  |  |  |  |  |  |  |  |  |  |
| heat resistance: heat sag (120° C.)(mm) | 5 | 4 | 3 | 7 | 5 | 2 | 2 | 5 | 5 | 5 | 5 | 5 | 10 | 10 |
| cold resistance: Izod impact strength (−20° C.)(kg · cm/cm) | NB | NB | NB | NB | NB | NB | NB | NB | NB | NB | NB | NB | NB | NB |
| shape stability: initial flexural strength (kgf/cm$^2$) | 3500 | 3900 | 4200 | 3500 | 3700 | 4400 | 5300 | 3600 | 3500 | 3600 | 3600 | 3700 | 3800 | 3200 |
| dimension stability: linear expansion coefficient ($\times 10^{-4}$)(mm/mm/°C.) | 110 | 90 | 70 | 100 | 90 | 70 | 60 | 110 | 110 | 110 | 110 | 110 | 120 | 160 |

NB: not broken

TABLE 6

|  | E61 | E62 | E63 | E64 | E65 | E66 | E67 | R7 | E68 | E69 | E70 | E71 | E72 | E73 |
|---|---|---|---|---|---|---|---|---|---|---|---|---|---|---|
| Composition |  |  |  |  |  |  |  |  |  |  |  |  |  |  |
| first step |  |  |  |  |  |  |  |  |  |  |  |  |  |  |

TABLE 6-continued

|  | E61 | E62 | E63 | E64 | E65 | E66 | E67 | R7 | E68 | E69 | E70 | E71 | E72 | E73 |
|---|---|---|---|---|---|---|---|---|---|---|---|---|---|---|
| EPDM (3) | 70 | 70 | 70 | 70 | 70 | 70 | 70 | 70 | 70 | 70 | 70 | 70 | 70 | 70 |
| PP | 30 | 30 | 30 | 30 | 30 | 30 | 30 | 30 | 30 | 30 | 30 | 30 | 30 | 30 |
| MAH | 0.5 | 0.5 | 0.5 | 0.5 | 0.5 | 0.5 | 0.5 | — | 0.3 | 1.0 | 2.0 | 3.0 | 1.0 | 0.5 |
| DVB | 0.5 | 0.5 | 0.5 | 0.5 | 0.5 | 0.5 | 0.5 | 0.5 | 0.4 | 0.7 | 0.8 | 0.9 | 0.7 | 0.5 |
| peroxide (B) | 0.3 | 0.3 | 0.3 | 0.3 | 0.3 | 0.3 | 0.3 | 0.3 | 0.2 | 0.5 | 0.6 | 0.7 | 0.5 | 0.3 |
| second step |  |  |  |  |  |  |  |  |  |  |  |  |  |  |
| milled glass fiber | 5 | 10 | 15 | — | — | — | — | 5 | 5 | 5 | 5 | 5 | 5 | — |
| glass flake | — | — | — | 10 | — | — | — | — | — | — | — | — | — | — |
| potassium titanate fiber | — | — | — | — | 10 | 20 | 30 | — | — | — | — | — | — | — |
| third step |  |  |  |  |  |  |  |  |  |  |  |  |  |  |
| elastomer obtained at second step | 100 | 100 | 100 | 100 | 100 | 100 | 100 | 100 | 100 | 100 | 100 | 100 | 100 | 100 |
| AEA | 1.0 | 1.0 | 1.0 | 1.0 | 1.0 | 1.0 | 1.0 | — | 0.6 | 1.5 | 3.0 | 4.5 | 0.5 | 1.0 |
| Basic Physical Properties |  |  |  |  |  |  |  |  |  |  |  |  |  |  |
| $M_{100}$ (kgf/cm$^2$) | 69 | 78 | 99 | 70 | 75 | 93 | 120 | 60 | 67 | 68 | 68 | 68 | 69 | 65 |
| $T_B$ (kgf/cm$^2$) | 139 | 157 | 197 | 140 | 147 | 192 | 223 | 125 | 139 | 142 | 142 | 141 | 140 | 130 |
| $E_B$ (%) | 530 | 485 | 430 | 455 | 510 | 460 | 400 | 583 | 525 | 536 | 535 | 537 | 535 | 550 |
| $H_s$ shore D hardness | 38 | 39 | 42 | 37 | 38 | 41 | 45 | 36 | 38 | 39 | 38 | 38 | 38 | 38 |
| gel content | 78 | 78 | 79 | 79 | 78 | 78 | 77 | 78 | 78 | 78 | 78 | 78 | 78 | 77 |
| Peeling Strength to Urethane Coating (g/cm) | 890 | 875 | 870 | 850 | 870 | 860 | 835 | below 0.1 | 880 | 880 | 870 | 840 | 900 | 890 |
| Other Physical Properties |  |  |  |  |  |  |  |  |  |  |  |  |  |  |
| heat resistance: heat sag (120° C.)(mm) | 11 | 8 | 5 | 9 | 8 | 4 | 3 | 16 | 10 | 10 | 10 | 10 | 10 | 15 |
| cold resistance: Izod impact strength (−20° C.)(kg · cm/cm) | NB | NB | NB | NB | NB | NB | NB | NB | NB | NB | NB | NB | NB | NB |
| shape stability: initial flexural strength (kgf/cm$^2$) | 2500 | 2800 | 3700 | 2400 | 2700 | 3600 | 4400 | 2100 | 2600 | 2600 | 2600 | 2500 | 2600 | 2200 |
| dimension stability: linear expansion coefficient ($\times 10^{-6}$)(mm/mm/°C.) | 100 | 80 | 60 | 100 | 80 | 60 | 50 | 160 | 100 | 100 | 100 | 100 | 90 | 160 |

NB: not broken

EXAMPLE 74

A composition comprising 50 parts by weight of a pelletized ethylene/propylene copolymer (ethylene content = 80 mole %; hereinafter referred to "EPR"), 50 parts by weight of PP, 0.5 part by weight of MAH, 0.12 part by weight of DVB and 0.06 part by weight of peroxide (A) was stirred by a Henschel mixer, and the mixture was extruded at 220° C. in a nitrogen atmosphere by a twin-screw extruder to prepare a thermoplastic elastomer composition.

Then, the obtained square pellet of the composition was stirred with 1.0 part by weight of AE by a Henschel mixer, and the mixture was extruded at 220° C. in a nitrogen atmosphere by a twin-screw extruder to prepare a thermoplastic elastomer composition.

EXAMPLE 75

A thermoplastic elastomer composition was prepared in the same manner as described in Example 74 except that 70 parts by weight of EPDM (2) was used instead of EPR.

The results obtained in Examples 74 and 75 are shown in Table 7.

TABLE 7

|  | E74 | E75 |
|---|---|---|
| Composition |  |  |
| first step |  |  |
| EPR | 50 | — |
| EPDM (2) | — | 50 |
| PP | 50 | 50 |
| MAH | 1.0 | 1.0 |
| DVB | 0.12 | 0.12 |
| peroxide (A) | 0.06 | 0.06 |
| second step |  |  |
| AEA | 1.0 | 10 |
| Basic Physical Properties |  |  |
| $M_{100}$ (kgf/cm$^2$) | 50 | 51 |
| $T_B$ (kgf/cm$^2$) | 120 | 115 |
| $E_B$ (%) | 345 | 378 |
| $H_S$ Shore D hardness | 36 | 40 |
| FM (kgf/cm$^2$) | 2000 | 2500 |
| Gel content | 1.7 | 2.0 |
| Bonding Strength |  |  |
| peeling strength to urethane coating (g/cm) | 920 | 915 |
| bonding strength to nylon (kg/cm) | 7.2 | 7.4 |
| bonding strength to polyurethane (kg/cm) | 1.4 | 1.5 |
| bonding strength to steel sheet (kg/cm) | 6.2 | 6.1 |

EXAMPLE 76

A blend was prepared by stirring 100 parts by weight of polypropylene (ethylene content = 11 mole %, melt flow rate (ASTM D-123B, 230° C.) = 25, density = 0.91 g/cm$^3$, hereinafter referred to as "PP (1)"), 0.5 part by weight of MAH, 0.05 part by weight of DVB and 0.03 part by weight of peroxide (A) by a Henschel mixer, and the blend was extruded at 220° C. in a nitrogen atmosphere by a twin-screw extruder (first step).

Then, a blend was prepared by stirring 100 parts by weight of the square pellet of the above composition with 1.0 part by weight of AEA by a Henschel mixer, and the blend was extruded at 220° C. in a nitrogen atmosphere by a twin-screw extruder (second step).

EXAMPLES 77 THROUGH 79

Thermoplastic resin compositions were prepared in the same manner as described in Example 76 except that the amounts incorporated of WAH, DVB, peroxide (A) and AEA were changed.

COMPARATIVE EXAMPLE 8

A thermoplastic resin composition was prepared in the same manner as described in Example 76 except that AEA was not added at the second step.

EXAMPLE 80

A blend was prepared by stirring 100 parts by weight of PP (1), 0.5 part by weight of MAH, 0.05 part by weight of DVB and 0.03 part by weight of peroxide (A) by a Henschel mixer, and the blend was extruded at 220° C. in a nitrogen atmosphere by a twin-screw extruder (first step).

Then, a blend was prepared by stirring 100 parts by weight of the square pellet of the above-composition with 1.0 part by weight of AEA, and the blend was extruded at 220° C. in a nitrogen atmosphere by a twin-screw extruder (second step).

Then, a blend was prepared by stirring 100 parts by weight of the square pellet of the above composition with 10 parts by weight of a potassium titanate fiber by a Henschel mixer, and the blend was extruded at 220° C. in a nitrogen atmosphere by a twin-screw extruder (third step).

EXAMPLES 81 AND 82

Thermoplastic resin compositions were prepared in the same manner as described in Example 80 except that the amount incorporated of the potassium titanate was changed.

EXAMPLES 83 THROUGH 85

Thermoplastic resin compositions were prepared in the same manner as described in Example 80 except that the amounts incorporated of MAH, DVB, peroxide (A) and AEA were changed.

COMPARATIVE EXAMPLE 10

The procedures of Example 80 were repeated in the same manner except that AEA was not added at the second step.

COMPARATIVE EXAMPLE 11

The procedures of Example 80 were repeated in the same manner except that MAH was not added at the first step and AEA was not added at the second step.

The results obtained in Examples 76 through 85 and Comparative Examples 8 through 11 are shown in Tables 8 and 9.

TABLE 8

|  |  | E76 | E77 | E78 | E79 | R8 | R9 |
|---|---|---|---|---|---|---|---|
| Composition |  |  |  |  |  |  |  |
| first step | PP (1) | 100 | 100 | 100 | 100 | 100 | 100 |
|  | MAH | 0.5 | 0.3 | 1.0 | 2.0 | 0.5 | — |
|  | DVB | 0.05 | 0.03 | 0.1 | 0.2 | 0.05 | 0.05 |
|  | peroxide (A) | 0.03 | 0.01 | 0.06 | 0.12 | 0.03 | 0.03 |
| second step | AEA | 1.0 | 0.6 | 1.5 | 3.0 | — | — |
| Basic Physical Properties |  |  |  |  |  |  |  |
| stress at yield point (kgf/cm$^2$) |  | 390 | 385 | 390 | 395 | 395 | 300 |
| tensile strength at break (kgf/cm$^2$) |  | 260 | 260 | 265 | 255 | 275 | 190 |
| elongation at break (%) |  | 480 | 490 | 480 | 475 | 480 | 340 |
| initial flexural modulus (kgf/cm$^2$) |  | 17500 | 17000 | 17500 | 17500 | 18000 | 9000 |
| Bonding strength |  |  |  |  |  |  |  |
| peeling strength to urethane |  | 870 | 850 | 890 | 910 | below 0.1 | below 0.1 |
| coating (g/cm) |  |  |  |  |  |  |  |
| to nylon |  | * | * | * | * | * | below 0.1 |
| to polyurethane |  | 1.2 | 1.1 | 1.2 | 1.4 | below | below 0.1 |
| to steel sheet |  | * | * | * | * | * | below 0.1 |

*breaking of substrate

TABLE 9

|  |  | E80 | E81 | E82 | E83 | E84 | E85 | R10 | R11 |
|---|---|---|---|---|---|---|---|---|---|
| Composition |  |  |  |  |  |  |  |  |  |
| first step | PP (1) | 100 | 100 | 100 | 100 | 100 | 100 | 100 | 100 |
|  | MAH | 0.5 | 0.5 | 0.5 | 0.3 | 1.0 | 2.0 | 0.5 | — |
|  | DVB | 0.05 | 0.05 | 0.05 | 0.03 | 0.1 | 0.2 | 0.05 | 0.05 |
|  | peroxide (A) | 0.03 | 0.03 | 0.03 | 0.01 | 0.06 | 0.12 | 0.03 | 0.03 |
| second step | AEA | 1.0 | 1.0 | 1.0 | 0.6 | 1.5 | 3.0 | — | — |
| third step | potassium titanate fiber | 10 | 20 | 30 | 10 | 10 | 10 | 10 | 10 |
| Basic Physical Properties |  |  |  |  |  |  |  |  |  |
| stress at yield point (kgf/cm$^2$) |  | 385 | 390 | 420 | 380 | 385 | 400 | 380 | 340 |
| tensile strength at break (kgf/cm$^2$) |  | 270 | 315 | 330 | 270 | 275 | 290 | 275 | 230 |
| elongation at break (%) |  | 6 | 4 | 3 | 6 | 6 | 4 | 6 | 7 |
| initial flexural modulus (kgf/cm$^2$) |  | 46,000 | 50,000 | 60,000 | 45,000 | 46,000 | 48,000 | 45,000 | 43,000 |
| peeling strength to urethane coating (g/cm) |  | 860 | 850 | 850 | 810 | 840 | 840 | below 0.1 | below 0.1 |
| linear expansion coefficient ($\times 10^{-6}$)(mm/mm/°C.) |  | 90 | 80 | 70 | 90 | 90 | 80 | 90 | 150 |

EXAMPLE 86

A blend was prepared by stirring 100 parts by weight of PP (1), 1.0 part by weight of allylamine (hereinafter referred to "ANN"), 0.1 part by weight of DVB and 0.06 part by weight of peroxide (A) by a Henschel mixer, and the blend was extruded at 220° C. in a nitrogen atmosphere by using a twin-screw extruder having an L/D ratio of 44 and a screw diameter of 53 mm to prepare a thermoplastic resin composition.

EXAMPLES 87 THROUGH 89

Thermoplastic resin compositions were prepared in the same manner as described in Example 86 except that the amounts incorporated of ANN, DVB and peroxide (A) were changed.

EXAMPLE 90

A thermoplastic resin was prepared in the same manner as described in Example 86 except that 1.0 part by weight of acrylamide (hereinafter referred to as "ADD") was used instead of ANN.

EXAMPLE 91

In the same manner as described in Example 86, 100 parts by weight of polypropylene melt flow rate (ASTM D-1238, 230° C.)=11, density=0.91 g/cm$^3$; hereinafter referred to as "PP (2)" was stirred with 1.0 part by weight of ANN, 0.1 part by weight of DVB and 0.06 part by weight of peroxide (A) by a Henschel mixer, and the blend was extruded by a twin-screw extruder to prepare a thermoplastic resin composition.

EXAMPLES 92 THROUGH 94

Thermoplastic resin compositions were prepared in the same manner as described in Example 91 except that the amounts incorporated of ANN, DVB and peroxide (A) were changed.

EXAMPLE 95

A thermoplastic resin composition was prepared in Example 91 except that 1.0 part by weight of AAD was used instead of ANN.

EXAMPLE 96

A blend was prepared by stirring 100 parts by weight of PP (1), 1.0 part by weight of ANN, 0.1 part by weight of DVB and 0.06 part by weight of peroxide (A) by a Henschel mixer, and the blend was extruded at 220° C. in a nitrogen atmosphere by using a twin-screw extruder (first step).

Then, 100 parts by weight of the obtained square pellet of the above composition was stirred with 10 parts by weight of a potassium titanate fiber by a Henschel mixer and the formed blend was extruded at 220° C. in a nitrogen atmosphere by a twin-screw extruder (second step).

EXAMPLES 97 AND 98

Thermoplastic resin compositions were prepared in the same manner as described in Example 96 except that the amount incorporated of the potassium titanate fiber was changed.

EXAMPLES 99 THROUGH 101

Thermoplastic resin compositions were prepared in the same manner as described in Example 96 except that the amounts incorporated of ANN, DVB and peroxide (A) were changed.

EXAMPLE 102

A thermoplastic resin composition was prepared in the same manner as described in Example 96 except that AAD was used instead of ANN.

EXAMPLE 103

A blend was prepared by stirring 70 parts by weight of a pelletized ethylene/propylene/5-ethylidene-2-norbornene copolymer (ethylene content=78 mole %, iodine value=10, Mooney viscosity $ML_{1+4}$ (100° C.)=160, expanded oil amount=20% by weight; hereinafter referred to as "EPDM (4)"), 50 parts by weight of PP, 1.0 part by weight of ANN, 0.5 part by weight of DVS and 0.3 part by weight of peroxide (A) by a Henschel mixer, and the blend was extruded at 220° C. in a nitrogen atmosphere by using a twin-screw extruder having an L/D ratio of 44 and a screw diameter of 53 mm to prepare a thermoplastic elastomer composition.

EXAMPLES 104 THROUGH 106

Thermoplastic elastomer compositions were prepared in the same manner as described in Example 103 except that the amounts incorporated of ANN, DVB and peroxide (A) were changed.

EXAMPLE 107

A thermoplastic elastomer composition was prepared in the same manner as described in Example 103 except that 1.0 part by weight of acrylamide (AAD) was used instead of ANN.

EXAMPLE 108

A thermoplastic elastomer composition was prepared in the same manner as described in Example 103 except that the amounts incorporated of EPDM (4) and PP were changed.

EXAMPLES 109 THROUGH 11

Thermoplastic elastomer compositions were prepared in the same manner as described in Example 108 except that the amounts incorporated of ANN, DVB and peroxide (A) were changed.

EXAMPLE 112

A thermoplastic elastomer composition was prepared in the same manner as described in Example 108 except that 1.0 part by weight of AAD was used instead of ANN.

COMPARATIVE EXAMPLE 12

The procedures of 103 were repeated in the same manner except than ANN was not added.

COMPARATIVE EXAMPLE 13

A blend was prepared by stirring 90 parts by weight of EPDM (4), 30 parts by weight of PP, 10 parts by weight of IIR, 10 parts by weight of the oil, 1.0 part by weight of ANN, 0.7 part by weight of DVB and 0.5 part by weight of peroxide (A) by a Henschel mixer, and the blend was extruded at 220° C. in a nitrogen atmosphere by a twin-screw extruder to form a thermoplastic elastomer composition.

EXAMPLES 114 THROUGH 116

Thermoplastic elastomer compositions were prepared in Example 113 except that the amounts incorporated of ANN, DVB and peroxide (A) were changed.

EXAMPLE 117

A thermoplastic elastomer composition was prepared in the same manner as described in Example 113 except that 1.0 part by weight AAD was used instead of ANN.

COMPARATIVE EXAMPLE 14

The procedures of Example 113 were repeated in the same manner except that ANN was not added.

EXAMPLE 118

A blend was prepared by stirring 70 parts by weight of EPDM (4), 50 parts by weight of PP, 1.0 parts by weight of ANN, 0.7 part by weight of DVB and 0.5 part by weight of peroxide (A) by a Henschel mixer, and the blend was extruded at 220° C. in a nitrogen atmosphere by a twin-screw extruder (first step).

A blend was prepared by stirring 100 parts by weight of the square pellet of the above composition with 10 parts by weight of a potassium titanate fiber by a Henschel mixer, and the blend was extruded at 220° C. in a nitrogen atmosphere by a twin-screw extruder (second step).

EXAMPLES 119 AND 120

Thermoplastic elastomer compositions were prepared in the same manner as described in Example 118 except that the amount incorporated of the potassium titanate fiber was changed.

EXAMPLES 121 THROUGH 123

Thermoplastic elastomer compositions were prepared in the same manner as described in Example 118 except that the amounts incorporated of ANN, DVB and peroxide (A) were changed.

EXAMPLE 124

A thermoplastic elastomer composition was prepared in the same manner as described in Example 118 except that 1.0 part by weight of AAD was used instead of ANN.

COMPARATIVE EXAMPLE 15

The procedures of Example 118 were repeated in the same manner except that ANN was not added.

EXAMPLE 125

A thermoplastic elastomer composition was prepared in the same manner as described in Example 118 except that the amounts incorporated of EPDM (4) and PP were changed.

EXAMPLES 126 and 127

Thermoplastic elastomer compositions were prepared in the same manner as described in Example 125 except that the amount incorporated of the potassium titanate fiber was changed.

EXAMPLES 128 THROUGH 130

Thermoplastic elastomer compositions were prepared in the same manner as described in Example 125 except that the amounts incorporated of ANN, DVB and peroxide (A) were changed.

EXAMPLE 131

A thermoplastic elastomer composition was prepared in the same manner as described in Example 125 except that 1.0 part by weight of ADD was used instead of ANN.

EXAMPLE 132

A blend was prepared by blending 40 parts by weight of EPDM (4), 60 parts by weight of PP, 10 parts by weight of IIR, 10 parts by weight of the oil, 1.0 part by weight of ANN, 0.7 part by weight of DVB and 0.5 part by weight of peroxide (A) by a Henschel mixer, and the blend was extruded at 220° C. in a nitrogen atmosphere by a twin-screw extruder (first step).

A blend was prepared by stirring 100 parts by weight of the square pellet of the above composition with 10 parts by weight of a potassium titanate fiber by a Henschel mixer and the blend was extruded at 220° C. in a nitrogen atmosphere by a twin-screw extruder (second step).

EXAMPLES 133 AND 134

Thermoplastic elastomer compositions were prepared in the same manner as described in Example 132 except that the amount incorporated of the potassium titanate fiber was changed.

EXAMPLES 135 THROUGH 137

Thermoplastic elastomer compositions were prepared in the same manner as described in Example 132 except that the amounts incorporated of ANN, DVB and peroxide (A) were changed.

EXAMPLE 138

A thermoplastic elastomer composition was prepared in the same manner as described in Example 132 except that 1.0 part by weight of AAD was used instead of ANN.

COMPARATIVE EXAMPLE 16

A thermoplastic elastomer composition was prepared in the same manner as described in Example 132 except that ANN was not added.

EXAMPLE 139

In a nitrogen atmosphere, 70 parts by weight of EPDM (1) was kneaded with 30 parts by weight of PP at 190° C. for 5 minutes, and the kneaded mixture was passed through rolls and formed into a square pellet by a sheet cutter (first step).

A blend was prepared by stirring 100 parts by weight of the square pellet with 1.0 part by weight of ANN, 0.7 part by weight of DVB and 0.5 part by weight of peroxide (A) by a Henschel mixer, and the blend was extruded at 220° C. in a nitrogen atmosphere by a Henschel mixer to prepare a thermoplastic elastomer composition (second step).

EXAMPLE 140

In the same manner as described in Example 139, a square pellet was prepared from 70 parts by weight of EPDM (1), 30 parts by weight of PP, 10 parts by weight of IIR and 30 parts by weight of the oil (first step).

Then, in the same manner as described in Example 139, a thermoplastic elastomer composition was prepared from 100 parts by weight of the above square pellet, 1.0 part by weight of ANN, 0.7 part by weight of DVB and 0.5 part by weight of peroxide (A) (second step).

EXAMPLE 141

In the same manner as described in Example 139, a square pellet was prepared from 20 parts by weight of EPDM (1), 60 parts by weight of PP, 10 parts by weight of IIR, 10 parts by weight of the oil and 10 parts by weight of a potassium titanate fiber (first step).

In the same manner as described in Example 139, a thermoplastic elastomer composition was prepared from 100 parts by weight of the obtained pellet, 1.0 part by weight of ANN, 0.7 part by weight of DVB and 0.5 part by weight of peroxide (A) (second step).

EXAMPLE 142

A blend was prepared by stirring 100 parts by weight of PP (1), 1.0 part by weight of ANN, 0.1 part by weight of DVB and 0.06 part by weight of peroxide (A) by a Henschel mixer, and the blend was extruded at 220° C. in a nitrogen atmosphere by a twin-screw extruder (first step).

Then, a blend was prepared by stirring 100 parts by weight of the formed square pellet of the above composition, 0.5 part by weight of MAH, 0.05 part by weight of DVB and 0.03 part by weight of peroxide (A) by a Henschel mixer, and the blend was extruded at 220° C. in a nitrogen atmosphere by a twin-screw extruder (second step).

Then, a blend was prepared by stirring 100 parts by weight of the obtained square pellet of the above composition and the blend was extruded at 220° C. in a nitrogen atmosphere by a twin-screw extruder (third step).

EXAMPLE 145

A blend was prepared by stirring 70 parts by weight of EPDM (4), 50 parts by weight of PP, 1.0 part by weight of ANN, 0.7 part by weight of DVB and 0.5 part by weight of peroxide (A) by a Henschel mixer, and the blend was extruded at 220° C. in a nitrogen atmosphere (first step).

Then, a blend was prepared by stirring 100 parts by weight of the formed pellet of the above composition, 0.05 part by weight of DVB and 0.03 part by weight of peroxide (A), and the blend was extruded at 220° C. in a nitrogen atmosphere by a twin-screw extruder (second step).

EXAMPLE 146

A thermoplastic elastomer was prepared in the same manner as described in Example 145 except that 1.0 part by weight was used instead of ANN.

EXAMPLE 147

A blend was prepared by stirring 90 parts by weight of EPDM (4), 30 parts by weight of PP, 10 parts by weight of IIR, 10 parts by weight of a paraffinic process oil, 1.0 part by weight of ANN, 0.7 part by weight of DVB and 0.5 part by weight of peroxide (A), and the blend was extruded at 220° C. in a nitrogen atmosphere by a twin-screw extruder to prepare a thermoplastic elastomer composition (first step).

A blend was prepared by stirring 100 parts by weight of the obtained square pellet by the above composition with 0.5 part by weight of MAH, 0.05 part by weight of DVB and 0.03 part by weight of peroxide (A) by a Henschel mixer, and the mixture was extruded at 220° C. in a nitrogen atmosphere by a twin-screw extruder (second step).

EXAMPLE 148

A blend was prepared by stirring 70 parts by weight of EPDM (4), 50 parts by weight of PP, 1.0 part by weight of ANN, 0.7 part by weight of DVB and 0.5 part by weight of peroxide (A) by a Henschel mixer, and the blend was extruded at 220° C. in a nitrogen atmosphere by a twin-screw extruder (first step).

Then, a blend was prepared by stirring 100 parts by weight of the square pellet of the above composition with 0.5 part by weight of MAH, 0.05 part by weight of DVB and 0.03 part by weight of peroxide (A) by a Henschel mixer, and the blend was extruded at 220° C. in a nitrogen atmosphere by a twin-screw extruder (second step).

Then, a blend was prepared by stirring the obtained square pellet of the above composition with 10 parts by weight of a potassium titanate fiber, and the blend was extruded at 220° C. in a nitrogen atmosphere by a twin-screw extruder (third step).

EXAMPLE 149

A blend was prepared by stirring 90 parts by weight of EPDM (4), 30 parts by weight of PP, 10 parts by weight of IIR, 10 parts by weight of a paraffinic process oil, 1.0 part by weight of ANN, 0.7 part by weight of DVB and 0.5 part by weight of peroxide (A) by a Henschel mixer, and the blend was extruded at 220° C. in a nitrogen atmosphere by a twin-screw extruder to obtain a thermoplastic elastomer composition (first step).

Then, a blend was prepared by stirring 100 parts by weight of the obtained square pellet with 0.5 part by weight of MAH, 0.05 part by weight of DVB and 0.03 part by weight of a Henschel mixer, and the blend was extruded at 220° C. in a nitrogen atmosphere by a twin-screw extruder (second step).

Then, a blend was prepared by stirring 100 parts by weight of the obtained square pellet having the above composition with 10 parts by weight of a potassium titanate fiber by a Henschel mixer, and the blend was extruded at 220° C. by a twin-screw extruder in a nitrogen atmosphere by a twin-screw extruder (third step).

The results obtained in Examples 86 through 149 and Comparative Examples 12 through 16 are shown in Tables 10 through 18.

TABLE 10

| | E86 | E87 | E88 | E89 | E90 | E91 | E92 | E93 | E94 | E95 |
|---|---|---|---|---|---|---|---|---|---|---|
| Composition | | | | | | | | | | |
| PP (1) | 100 | 100 | 100 | 100 | 100 | — | — | — | — | — |
| PP (2) | — | — | — | — | — | 100 | 100 | 100 | 100 | 100 |
| ANN | 1.0 | 0.3 | 0.5 | 2.0 | — | 1.0 | 0.3 | 0.5 | 2.0 | — |
| AAD | — | — | — | — | 0.1 | — | — | — | — | 1.0 |
| DVB | 0.1 | 0.03 | 0.05 | 0.2 | 0.1 | 0.1 | 0.03 | 0.05 | 0.2 | 0.1 |
| peroxide (A) | 0.06 | 0.01 | 0.03 | 0.12 | 0.06 | 0.06 | 0.01 | 0.03 | 0.12 | 0.06 |
| Basic Physical Properties | | | | | | | | | | |

TABLE 10-continued

| | E86 | E87 | E88 | E89 | E90 | E91 | E92 | E93 | E94 | E95 |
|---|---|---|---|---|---|---|---|---|---|---|
| stress at yield point (kgf/cm$^2$) | 380 | 375 | 375 | 385 | 380 | 290 | 295 | 290 | 290 | 290 |
| tensile strength at break (kgf/cm$^2$) | 255 | 260 | 260 | 255 | 255 | 210 | 220 | 220 | 210 | 210 |
| elongation at break (%) | 490 | 495 | 490 | 490 | 495 | 110 | 120 | 115 | 110 | 105 |
| initial flexural modulus (Kgf/cm$^2$) | 17,000 | 17,000 | 17,000 | 17,000 | 17,000 | 13,500 | 13,500 | 13,500 | 13,500 | 13,500 |
| Bonding Strength | | | | | | | | | | |
| peeling strength to urethane coating (g/cm) | 890 | 870 | 875 | 910 | 850 | 880 | 865 | 865 | 890 | 820 |
| bonding strength to nylon (kg/cm) | * | * | * | * | * | * | * | * | * | * |
| bonding strength to polyurethane (kg/cm) | 1.1 | 1.1 | 1.1 | 1.3 | 1.1 | 1.1 | 1.1 | 1.2 | 1.0 | |
| bonding strength to steel sheet (kg/cm) | * | * | * | * | * | * | * | * | * | * |

*breaking of substrate

TABLE 11

| | E96 | E97 | E98 | E99 | E100 | E101 | E102 |
|---|---|---|---|---|---|---|---|
| Composition | | | | | | | |
| PP (1) | 100 | 100 | 100 | 100 | 100 | 100 | 100 |
| ANN | 1.0 | 1.0 | 1.0 | 0.3 | 0.5 | 2.0 | — |
| AAD | — | — | — | — | — | — | 1.0 |
| DVB | 0.1 | 0.1 | 0.1 | 0.03 | 0.05 | 0.2 | 0.1 |
| peroxide (A) | 0.06 | 0.06 | 0.06 | 0.01 | 0.03 | 0.12 | 0.06 |
| potassium titanate fiber | 10 | 20 | 30 | 10 | 10 | 10 | 10 |
| Basic Physical Properties | | | | | | | |
| stress at yield point (kgf/cm$^2$) | 390 | 400 | 420 | 380 | 385 | 390 | 375 |
| tensile strength at break (kgf/cm$^2$) | 290 | 310 | 325 | 295 | 290 | 295 | 260 |
| elongation at break (%) | 5 | 3 | 2 | 5 | 5 | 4 | 6 |
| initial flexural modulus (kgf/cm$^2$) | 45,000 | 50,000 | 58,000 | 44,000 | 45,000 | 46,000 | 43,000 |
| Peeling Strength to Urethane (g/cm) | 850 | 840 | 840 | 800 | 820 | 870 | 830 |
| Linear Expansion Coefficient ($\times 10^{-6}$)(mm/mm/°C.) | 90 | 80 | 70 | 90 | 90 | 90 | 90 |

TABLE 12

| | E103 | E104 | E105 | E106 | E107 | E108 | E109 | E110 | E111 | E112 | R12 | R13 |
|---|---|---|---|---|---|---|---|---|---|---|---|---|
| Composition | | | | | | | | | | | | |
| EPDM (4)* | 70 | 70 | 70 | 70 | 70 | 90 | 90 | 90 | 90 | 90 | 70 | 90 |
| PP | 50 | 50 | 50 | 50 | 50 | 30 | 30 | 30 | 30 | 30 | 50 | 30 |
| ANN | 1.0 | 0.3 | 0.5 | 2.0 | — | 1.0 | 0.3 | 0.5 | 2.0 | — | — | — |
| AAD | — | — | — | — | 1.0 | — | — | — | — | 1.0 | — | — |
| DVB | 0.7 | 0.4 | 0.5 | 0.8 | 0.7 | 0.7 | 0.4 | 0.5 | 0.8 | 0.7 | 0.7 | 0.7 |
| peroxide (A) | 0.5 | 0.2 | 0.3 | 0.6 | 0.5 | 0.5 | 0.2 | 0.3 | 0.6 | 0.5 | 0.5 | 0.5 |
| Basic Physical Properties | | | | | | | | | | | | |
| M$_{100}$ (kgf/cm$^2$) | 75 | 74 | 75 | 73 | 75 | 42 | 41 | 41 | 43 | 40 | 70 | 38 |
| T$_B$ (kgf/cm$^2$) | 160 | 162 | 165 | 160 | 162 | 105 | 102 | 103 | 108 | 104 | 152 | 99 |
| E$_B$ (%) | 630 | 620 | 635 | 630 | 625 | 580 | 575 | 577 | 585 | 575 | 620 | 570 |
| H$_S$ JIS A | — | — | — | — | — | 82 | 81 | 81 | 82 | 82 | — | 81 |
| shore D | 38 | 37 | 37 | 38 | 37 | — | — | — | — | — | 36 | — |
| P$_S$ (%) | — | — | — | — | — | 20 | 19 | 19 | 19 | 19 | — | 17 |
| FM (kgf/cm$^2$) | 2600 | 2600 | 2600 | 2700 | 2600 | — | — | — | — | — | 2600 | — |
| SP (°C.) | 147 | 145 | 146 | 145 | 146 | 137 | 137 | 137 | 136 | 137 | 146 | 135 |
| gel content | 60 | 61 | 60 | 62 | 61 | 94 | 93 | 93 | 95 | 94 | 61 | 93 |
| Bonding Strength | | | | | | | | | | | | |
| peeling strength to urethane coating (g/cm) | 900 | 920 | 980 | 990 | 900 | 910 | 890 | 900 | 940 | 880 | below 0.1 | below 0.1 |
| bonding strength to nylon (kg/cm) | 7.5 | 7.3 | 7.4 | 7.9 | 7.5 | 7.2 | 7.1 | 7.2 | ** | 7.2 | below 0.1 | below 0.1 |
| bonding strength to polyurethane (kg/cm) | 1.2 | 1.1 | 1.1 | 1.3 | 1.2 | 1.1 | 0.9 | 1.0 | 1.2 | 1.0 | below 0.1 | below 0.1 |
| bonding strength to steel sheet (kg/cm) | 6.5 | 6.3 | 6.2 | 6.4 | 6.4 | 6.2 | 6.1 | 6.1 | ** | 5.9 | below 0.1 | below 0.1 |

*EPDM in which the expanded oil amount was 20 parts by weight
**breaking of substrate

TABLE 13

| | E113 | E114 | E115 | E116 | E117 | R14 |
|---|---|---|---|---|---|---|
| Composition | | | | | | |
| EPDM (4)* | 90 | 90 | 90 | 90 | 90 | 90 |
| PP | 30 | 30 | 30 | 30 | 30 | 30 |
| IIR | 10 | 10 | 10 | 10 | 10 | 10 |
| oil | 10 | 10 | 10 | 10 | 10 | 10 |
| ANN | 1.0 | 0.3 | 0.5 | 2.0 | — | — |
| AAD | — | — | — | — | 1.0 | — |
| DVB | 0.7 | 0.4 | 0.5 | 0.8 | 0.7 | 0.7 |
| peroxide (A) | 0.5 | 0.2 | 0.3 | 0.6 | 0.5 | 0.5 |
| Basic Physical Properties | | | | | | |
| M$_{100}$ (kgf/cm$^2$) | 26 | 25 | 26 | 27 | 26 | 25 |
| T$_B$ (kgf/cm$^2$) | 82 | 81 | 81 | 83 | 82 | 75 |
| E$_B$ (%) | 635 | 640 | 640 | 630 | 635 | 645 |
| H$_S$ JIS A | 65 | 64 | 64 | 64 | 65 | 65 |
| P$_S$ (%) | 9 | 8 | 8 | 10 | 9 | 8 |
| SP (°C.) | 120 | 121 | 121 | 121 | 121 | 120 |
| gel content | 96 | 96 | 96 | 97 | 96 | 95 |
| Bonding Strength | | | | | | |
| peeling strength to urethane coating (g/cm) | 930 | 920 | 920 | 940 | 900 | below 0.1 |
| bonding strength to | 7.1 | | 7.0 | 7.1 | 7.1 | below |

TABLE 13-continued

|  | E113 | E114 | E115 | E116 | E117 | R14 |
|---|---|---|---|---|---|---|
| nylon (kg/cm) |  |  |  |  |  | 0.1 |
| bonding strength to polyurethane (kg/cm) | 1.2 | 1.2 | 1.2 | 1.3 | 0.9 | below 0.1 |
| bonding strength to steel sheet (kg/cm) | 6.5 | 6.4 | 6.4 | 6.6 | 5.8 | below 0.1 |

*EPDM in which the expanded oil amount was 20 parts by weight

TABLE 16

|  | E139 | E140 | E141 |
|---|---|---|---|
| Composition |  |  |  |
| EPDM (1) | 70 | 70 | 20 |
| PP | 30 | 30 | 60 |
| IIR | — | 10 | 10 |
| oil | — | 30 | 10 |
| ANN | 1.0 | 1.0 | 1.0 |
| DVB | 0.7 | 0.7 | 0.7 |

TABLE 14

|  | E118 | E119 | E120 | E121 | E122 | E123 | E124 | R15 | E125 | E126 | E127 | E128 | E129 | E130 | E131 |
|---|---|---|---|---|---|---|---|---|---|---|---|---|---|---|---|
| Composition |  |  |  |  |  |  |  |  |  |  |  |  |  |  |  |
| EPDM (4)* | 70 | 70 | 70 | 70 | 70 | 70 | 70 | 70 | 90 | 90 | 90 | 90 | 90 | 90 | 90 |
| PP | 50 | 50 | 50 | 50 | 50 | 50 | 50 | 50 | 30 | 30 | 30 | 30 | 30 | 30 | 30 |
| ANN | 1.0 | 1.0 | 1.0 | 0.3 | 0.5 | 2.0 | — | — | 1.0 | 1.0 | 1.0 | 0.3 | 0.5 | 2.0 | — |
| AAD | — | — | — | — | — | — | 1.0 | — | — | — | — | — | — | — | 1.0 |
| DVB | 0.7 | 0.7 | 0.7 | 0.4 | 0.5 | 0.8 | 0.7 | 0.7 | 0.7 | 0.7 | 0.7 | 0.4 | 0.5 | 0.8 | 0.7 |
| peroxide (A) | 0.5 | 0.5 | 0.5 | 0.2 | 0.3 | 0.6 | 0.5 | 0.5 | 0.5 | 0.5 | 0.5 | 0.2 | 0.3 | 0.6 | 0.5 |
| potassium titanate fiber | 10 | 20 | 30 | 10 | 10 | 10 | 10 | 10 | 10 | 20 | 30 | 10 | 10 | 10 | 10 |
| Basic Physical Properties |  |  |  |  |  |  |  |  |  |  |  |  |  |  |  |
| $M_{100}$ (kgf/cm$^2$) | 90 | 98 | 110 | 91 | 91 | 92 | 89 | 95 | 76 | 91 | 122 | 75 | 78 | 82 | 77 |
| $T_B$ (kgf/cm$^2$) | 180 | 187 | 210 | 178 | 180 | 182 | 180 | 130 | 150 | 195 | 225 | 130 | 128 | 135 | 148 |
| $E_B$ (%) | 560 | 500 | 480 | 565 | 560 | 560 | 558 | 250 | 510 | 450 | 410 | 500 | 505 | 490 | 500 |
| $H_S$ Shore D hardness | 43 | 44 | 48 | 44 | 44 | 43 | 44 | 44 | 38 | 41 | 45 | 37 | 38 | 40 | 40 |
| gel content | 55 | 55 | 56 | 55 | 55 | 55 | 56 | 55 | 78 | 77 | 78 | 77 | 77 | 78 | 77 |
| Peeling Strength to Urethane Coating (g/cm) | 890 | 870 | 840 | 850 | 860 | 920 | 850 | below 0.1 | 870 | 850 | 830 | 870 | 870 | 910 | 810 |
| Other Physical Properties |  |  |  |  |  |  |  |  |  |  |  |  |  |  |  |
| heat resistance: heat sag (120° C.)(mm) | 5 | 2 | 2 | 5 | 5 | 6 | 6 | 11 | 8 | 4 | 3 | 8 | 8 | 8 | 8 |
| cold resistance: Izod impact strength (−20° C.)(kg · cm/cm) | NB | NB | 27 | NB | NB | NB | NB | NB | NB | NB | 22 | NB | NB | NB | NB |
| shape stability: initial flexural strength (kgf/cm$^2$) | 3500 | 4200 | 5100 | 3400 | 3500 | 3700 | 3500 | 3500 | 2700 | 3600 | 4500 | 2700 | 2700 | 2600 | 2700 |
| dimension stability: linear expansion coefficient (×10$^{-6}$)(mm/mm/°C.) | 90 | 70 | 60 | 90 | 90 | 90 | 90 | 140 | 90 | 70 | 60 | 90 | 90 | 90 | 90 |

*2: NB = not broken
*EPDM in which the expanded oil amount was 20 parts by weight

TABLE 15

|  | E132 | E133 | E134 | E135 | E136 | E137 | E138 | R19 |
|---|---|---|---|---|---|---|---|---|
| Composition |  |  |  |  |  |  |  |  |
| EPDM (4)* | 40 | 40 | 40 | 40 | 40 | 40 | 40 | 40 |
| PP | 60 | 60 | 60 | 60 | 60 | 60 | 60 | 60 |
| IIR | 10 | 10 | 10 | 10 | 10 | 10 | 10 | 10 |
| oil | 10 | 10 | 10 | 10 | 10 | 10 | 10 | 10 |
| ANN | 1.0 | 1.0 | 1.0 | 0.3 | 0.5 | 2.0 | — | — |
| AAD | — | — | — | — | — | — | 1.0 | — |
| DVB | 0.7 | 0.7 | 0.7 | 0.4 | 0.5 | 0.8 | 0.7 | 0.7 |
| peroxide (A) | 0.5 | 0.5 | 0.5 | 0.2 | 0.3 | 0.6 | 0.5 | 0.5 |
| potassium titanate fiber | 10 | 20 | 30 | 10 | 10 | 10 | 10 | 10 |
| Basic Physical Properties |  |  |  |  |  |  |  |  |
| $M_{100}$ (kgf/cm$^2$) | 120 | 132 | 190 | 121 | 120 | 125 | 119 | 125 |
| $T_B$ (kgf/cm$^2$) | 215 | 235 | 270 | 213 | 212 | 218 | 210 | 220 |
| $E_B$ (%) | 610 | 530 | 500 | 605 | 608 | 600 | 613 | 600 |
| $H_S$ Shore D hardness | 50 | 53 | 57 | 51 | 50 | 52 | 50 | 50 |
| gel content | 47 | 46 | 46 | 47 | 47 | 47 | 47 | 47 |
| Peeling Strength to Urethane Coating (g/cm) | 860 | 820 | 800 | 840 | 845 | 890 | 805 | below 0.1 |
| Other Physical Properties |  |  |  |  |  |  |  |  |
| heat resistance: heat sag (120° C.)(mm) | 4 | 3 | 2 | 4 | 4 | 4 | 4 | 10 |
| cold resistance: Izod impact strength (−20° C.)(kg · cm/cm) | NB*3 | NB*3 | 27.5 | NB*3 | NB*3 | NB*3 | NB*3 | NB*3 |
| Shape stability: initial flexural strength (kgf/cm$^2$) | 4600 | 5000 | 5700 | 4600 | 4600 | 4700 | 4600 | 4400 |
| dimension stability: linear expansion coefficient (×10$^{-6}$)(mm/mm/°C.) | 90 | 80 | 70 | 90 | 90 | 90 | 90 | 140 |

*EPDM in which the expanded oil amount was 20 parts by weight
*3: NB = not broken

| | | | |
|---|---|---|---|
| peroxide (A) | 0.5 | 0.5 | 0.5 |
| potassium titanate fiber | — | — | 10 |
| Basic Physical Properties | | | |

TABLE 16-continued

|  | E139 | E140 | E141 |
|---|---|---|---|
| $M_{100}$ (kgf/cm$^2$) | 45 | 27 | 120 |
| $T_B$ (kgf/cm$^2$) | 105 | 80 | 225 |
| $E_B$ (%) | 580 | 620 | 600 |
| $H_S$ JIS A | 82 | 65 | shore D hardness 50 |
| $P_S$ (%) | 18 | 9 | — |
| gel content | 96 | 97 | 47 |
| Peeling Strength to Urethane Coating (g/cm) | 890 | 870 | 890 |
| Other Physical Properties |  |  |  |
| heat resistance: heat sag (120° C.)(mm) | — | — | 4 |
| cold resistance: Izod impact strength*4 (−20° C.)(kg · cm/cm) | — | — | NB |
| Shape stability: initial flexural strength (kgf/cm$^2$) | — | — | 4500 |
| dimension stability: linear expansion coefficient ($\times 10^{-6}$)(mm/mm/°C.) | — | — | 90 |

*4: NB = not broken

TABLE 17

|  | E142 | E143 | E144 |
|---|---|---|---|
| Composition |  |  |  |
| first step |  |  |  |
| PP (1) | 100 | 100 | 100 |
| ANN | 1.0 | — | 1.0 |
| AAD | — | 1.0 | — |
| DVB | 0.1 | 0.1 | 0.1 |
| peroxide (A) | 0.06 | 0.06 | 0.06 |
| second step |  |  |  |
| MAH | 0.5 | 0.5 | 0.5 |
| DVB | 0.05 | 0.05 | 0.05 |
| peroxide (A) | 0.03 | 0.03 | 0.03 |
| potassium titanate fiber | — | — | 10 |
| Basic Physical Properties |  |  |  |
| stress at yield point (kgf/cm$^2$) | 370 | 365 | 400 |
| tensile strength at break (kgf/cm$^2$) | 250 | 255 | 295 |
| elongation at break (%) | 460 | 460 | 4 |
| initial flexural modulus (kgf/cm$^2$) | 16.000 | 16.000 | 45.000 |
| Bonding Strength |  |  |  |
| peeling strength to urethane coating (g/cm) | 900 | 880 | 860 |
| bonding strength to nylon (kg/cm) | * | * | — |
| bonding strength to polyurethane (kg/cm) | 1.7 | 1.7 | — |
| bonding strength to steel sheet (kg/cm) | * | * | — |
| Linear Expansion Coefficient ($\times 10^{-6}$)(mm/mm/°C.) | — | — | 80 |

*breaking of substrate

TABLE 18

|  | E145 | E146 | E147 | E148 | E149 |
|---|---|---|---|---|---|
| Composition |  |  |  |  |  |
| first step |  |  |  |  |  |
| EPDM (4) | 70 | 70 | 90 | 70 | 90 |
| PP | 50 | 50 | 30 | 50 | 30 |
| ANN | 1.0 | — | 1.0 | 1.0 | 1.0 |
| AAD | — | 1.0 | — | — | — |
| DVB | 0.7 | 0.7 | 0.7 | 0.7 | 0.7 |
| peroxide (A) | 0.5 | 0.5 | 0.5 | 0.5 | 0.5 |
| IIR | — | — | 10 | — | 10 |
| oil | — | — | 10 | — | 10 |
| second step |  |  |  |  |  |
| MAH | 0.5 | 0.5 | 0.5 | 0.5 | 0.5 |
| DVB | 0.05 | 0.05 | 0.05 | 0.05 | 0.05 |
| peroxide (A) | 0.03 | 0.03 | 0.03 | 0.03 | 0.03 |
| potassium titanate fiber | — | — | — | 10 | 10 |
| Basic physical properties |  |  |  |  |  |
| $M_{100}$ (kgf/cm$^2$) | 70 | 72 | 26 | 92 | 75 |
| $T_B$ (kgf/cm$^2$) | 155 | 157 | 80 | 180 | 157 |
| $E_B$ (%) | 630 | 630 | 640 | 565 | 514 |
| $H_s$ | shore D | shore D | JIS A | shore D | shore D |
| $P_s$ (%) | 39/ | 40/ | 66/12 | 44/ | 38/ |
| gel content | 60 | 60 | 96 | 55 | 79 |
| Initial Flexural Modulus (Kgf/cm$^2$) | 2600 | 2600 | — | 3600 | 2700 |
| Bonding strength |  |  |  |  |  |
| peeling strength to urethane coating (g/cm) | 900 | 850 | 890 | 900 | 910 |
| bonding strength to nylon (kg/cm) | 8.2 | 8.1 | 8.1 | — | — |
| bonding strength to polyurethane (kg/cm) | 1.6 | 1.5 | 1.6 | — | — |
| bonding strength to steel sheet (kg/cm) | 7.3 | 7.1 | 7.2 | — | — |
| Linear Expression Coefficient ($\times 10^{-6}$)(mm/mm/°C.) | — | — | — | 80 | 80 |

EXAMPLE 150

A blend was prepared by stirring 50 parts by weight of EPR, 50 parts by weight of PP, 1.0 part by weight of ANN, 0.12 part by weight of DVB and 0.06 part by weight of peroxide (A) by a Henschel mixer, and the blend was extruded at 220° C. in a nitrogen atmosphere by a twin-screw extruder having an L/D ratio of 44 and a screw diameter of 53 mm to prepare a thermoplastic elastomer composition.

EXAMPLE 151

A thermoplastic elastomer composition was prepared in the same manner as described in Example 150 except that 70 parts by weight of EPDM (4) was used instead of EPR.

The results obtained in Examples 150 and 151 are shown in Table 19.

TABLE 19

|  | E150 | E151 |
|---|---|---|
| Composition |  |  |
| EPR | 50 | — |
| EPDM (4) | — | 70 |

TABLE 19-continued

|  | E150 | E151 |
|---|---|---|
| PP | 50 | 50 |
| ANN | 1.0 | 1.0 |
| DVB | 0.12 | 0.12 |
| peroxide (A) | 0.06 | 0.06 |
| Basic Physical Properties |  |  |
| $M_{100}$ (kgf/cm$^2$) | 50 | 55 |
| $T_B$ (kgf/cm$^2$) | 123 | 118 |
| $E_B$ (%) | 350 | 400 |
| $H_s$ Shore D | 35 | 40 |
| FM (kgf/cm$^2$) | 1900 | 2400 |
| gel content | 1.5 | 2.0 |
| Bonding Strength |  |  |
| peeling strength to urethane coating (g/cm) | 910 | 900 |
| bonding strength to nylon (kg/cm) | 7.2 | 7.1 |
| bonding strength to polyurethane (kg/cm) | 1.2 | 1.2 |
| bonding strength to steel sheet (kg/cm) | 6.4 | 6.1 |

EXAMPLE 152

A composition comprising 50 parts by weight of EPDM (3), 50 parts by weight of PP, 0.5 part by weight of MAH, 0.5 part by weight of DVB, 0.3 part by weight of peroxide (B) and 1.0 part by weight of AEA was stirred by a Henschel mixer, and the mixture was extruded at 220° C. in a nitrogen atmosphere by a twin-screw extruder to prepare a thermoplastic elastomer composition.

The physical properties, coating peeling strength and bonding strength were measured. The obtained results as well as results obtained in subsequent Examples 153 through 157 are shown in Table 20.

EXAMPLES 153 through 157

Thermoplastic elastomers were prepared in the same manner as described in Example 152 except that the amounts incorporated of MAH, AEA, DVB and peroxide (B) were changed.

TABLE 20

|  | E152 | E153 | E154 | E155 | E156 | E157 |
|---|---|---|---|---|---|---|
| Composition |  |  |  |  |  |  |
| EPDM (3) | 50 | 50 | 50 | 50 | 50 | 50 |
| PP | 50 | 50 | 50 | 50 | 50 | 50 |
| MAH | 0.5 | 0.3 | 1.0 | 2.0 | 3.0 | 1.0 |
| DVB | 0.5 | 0.4 | 0.7 | 0.8 | 0.9 | 0.7 |
| peroxide (B) | 0.3 | 0.2 | 0.5 | 0.6 | 0.7 | 0.5 |
| AEA | 1.0 | 0.6 | 1.5 | 3.0 | 4.5 | 0.5 |
| Basic Physical Properties |  |  |  |  |  |  |
| $M_{100}$ (kgf/cm$^2$) | 85 | 84 | 87 | 87 | 87 | 85 |
| $T_B$ (kgf/cm$^2$) | 180 | 175 | 182 | 182 | 187 | 178 |
| $E_B$ (%) | 610 | 600 | 620 | 620 | 620 | 620 |
| $H_S$ Shore D hardness | 45 | 46 | 46 | 47 | 46 | 43 |
| FM (kgf/cm$^2$) | 3200 | 3200 | 3300 | 3300 | 3300 | 3200 |
| SP (°C.) | 140 | 139 | 140 | 140 | 140 | 141 |
| gel content | 56 | 56 | 57 | 57 | 57 | 53 |
| Bonding Strength |  |  |  |  |  |  |
| peeling strength to urethane coating (g/cm) | 890 | 870 | 890 | 950 | 990 | 860 |
| bonding strength to nylon (kg/cm) | 7.9 | 7.9 | 8.1 | * | * | 8.0 |
| bonding strength to polyurethane (kg/cm) | 1.1 | 1.0 | 1.1 | 1.2 | 1.2 | 0.9 |
| bonding strength to steel sheet (kg/cm) | 8.0 | 8.0 | 8.1 | * | * | 8.1 |

*breaking of substrate

EXAMPLE 158

A composition comprising 70 parts by weight of EPDM (3), 30 parts by weight of PP, 10 parts by weight of IIR, 30 parts by weight of the oil, 0.5 part by weight of MAH, 0.5 part by weight of DVB, 0.3 part by weight of peroxide (B) and 1.0 part by weight of AEA was stirred by a Henschel mixer, and the mixture was extruded at 220° C. in a nitrogen atmosphere by a twin-screw extruder to form a thermoplastic elastomer composition.

EXAMPLES 159 through 163

Thermoplastic elastomers were prepared in the same manner as described in Example 158 except that the amounts incorporated of MAH, AEA, DVB and peroxide (B) were changed.

The physical properties of the compositions obtained in Examples 158 through 163 are shown in Table 21.

TABLE 21

|  | E158 | E159 | E160 | E161 | E162 | E163 |
|---|---|---|---|---|---|---|
| Composition |  |  |  |  |  |  |
| EPDM (3) | 70 | 70 | 70 | 70 | 70 | 70 |
| PP | 30 | 30 | 30 | 30 | 30 | 30 |
| IIR | 10 | 10 | 10 | 10 | 10 | 10 |
| oil | 30 | 30 | 30 | 30 | 30 | 30 |
| MAH | 0.5 | 0.3 | 1.0 | 2.0 | 3.0 | 1.0 |
| DVB | 0.5 | 0.4 | 0.7 | 0.8 | 0.9 | 0.7 |
| peroxide (B) | 0.3 | 0.2 | 0.5 | 0.6 | 0.7 | 0.5 |
| AEA | 1.0 | 0.6 | 1.5 | 3.0 | 4.5 | 0.5 |
| Basic Physical Properties |  |  |  |  |  |  |
| $M_{100}$ (kgf/cm$^2$) | 30 | 29 | 31 | 31 | 32 | 32 |
| $T_B$ (kgf/cm$^2$) | 90 | 90 | 92 | 93 | 92 | 90 |
| $E_B$ (%) | 625 | 620 | 621 | 621 | 620 | 620 |
| $H_S$ JIS A | 65 | 66 | 66 | 66 | 66 | 65 |
| $P_S$ (%) | 9 | 9 | 10 | 10 | 10 | 9 |
| SP (°C.) | 120 | 121 | 120 | 120 | 120 | 120 |
| gel content | 96 | 96 | 96 | 96 | 96 | 97 |
| Bonding Strength |  |  |  |  |  |  |
| peeling strength to urethane coating (g/cm) | 890 | 880 | 895 | 910 | 970 | 850 |
| bonding strength to nylon (kg/cm) | 8.0 | 7.9 | 7.9 | 8.1 | 8.0 | 8.0 |
| bonding strength to polyurethane (kg/cm) | 1.2 | 1.1 | 1.2 | 1.1 | 1.1 | 1.1 |
| bonding strength to steel sheet (kg/cm) | 8.1 | 8.0 | 8.0 | 8.0 | 7.9 | 8.1 |

EXAMPLE 164

A composition comprising 50 parts by weight of EPDM (3), 50 parts by weight of PP, 0.5 part by weight of MAH, 0.5 part by weight of DVB, 0.3 part by weight of peroxide (B) and 1.0 part by weight of AEA was stirred by a Henschel mixer, and the mixture was extruded at 220° C. in a nitrogen atmosphere by a twin-screw extruder to form a thermoplastic elastomer (first step).

Then, 100 parts by weight of the obtained square pellet of the above composition was kneaded with 10 parts by weight of a potassium titanate fiber by a Banbury mixer at 200° C. for 5 minutes in a nitrogen atmosphere, and the kneaded mixture was passed through rolls and formed into a square pellet by a sheet cutter (second step).

COMPARATIVE EXAMPLE 16

The procedures of Example 164 were repeated in the same manner except that MAH and AEA were not added at the first step.

EXAMPLE 165

A thermoplastic elastomer was prepared in the same manner as described in Example 164 except that the amounts incorporated of MAH, AEA, DVB and peroxide (B) were changed.

The results obtained in Examples 164 and 165 and Comparative Example 16 are shwon in Table 22.

TABLE 22

|  | E164 | R16 | E165 |
| --- | --- | --- | --- |
| Composition |  |  |  |
| EPDM (3) | 50 | 50 | 50 |
| PP | 50 | 50 | 50 |
| MAH | 0.5 | — | 1.0 |
| DVB | 0.5 | 0.5 | 0.7 |
| peroxide (B) | 0.3 | 0.3 | 0.5 |
| AEA | 1.0 | — | 0.5 |
| potassium titanate fiber | 10 | 10 | 10 |
| Basic Physical Properties |  |  |  |
| $M_{100}$ (kgf/cm$^2$) | 90 | 95 | 92 |
| $T_B$ (kgf/cm$^2$) | 190 | 110 | 200 |
| $E_B$ (%) | 495 | 250 | 480 |
| $H_S$ Shore D hardness | 43 | 43 | 45 |
| gel content | 55 | 55 | 56 |
| Peeling Strength to Urethane Coating (g/cm) | 880 | below 0.1 | 850 |
| Other Physical Properties |  |  |  |
| heat resistance: heat sag (120° C.)(mm) | 5 | 11 | 5 |
| cold resistance: Izod impact strength (−20° C.)(kg · cm/cm) | NB*6 | NB*6 | NB*6 |
| Shape stability: initial flexural strength (kgf/cm$^2$) | 3600 | 3700 | 3700 |
| dimension stability: linear expansion coefficient ($\times 10^{-6}$)(mm/mm/°C.) | 90 | 130 | 80 |

*6: NB = not broken

EXAMPLE 166

A composition comprising 50 parts by weight of EPR, 50 parts by weight of PP, 0.5 part by weight of MAH, 0.12 part by weight of DVB, 0.06 part by weight of peroxide (B) and 1.0 part by weight of AEA was stirred by a Henschel mixer, and the mixture was extruded at 220° C. in a nitrogen atmosphere by a twin-screw extruder to prepare a thermoplastic elastomer.

EXAMPLE 167

A thermoplastic elastomer composition was prepared in the same manner as described in Example 166 except that 70 parts by weight of EPDM (3) was used instead of EPR.

The physical properties of the compositions obtained in Examples 166 and 167 are shown in Table 23.

TABLE 23

|  | E166 | E167 |
| --- | --- | --- |
| Composition |  |  |
| EPR | 50 | — |
| EPDM (3) | — | 70 |
| PP | 50 | 50 |
| MAH | 0.5 | 0.5 |
| DVB | 0.12 | 0.12 |
| peroxide (B) | 0.06 | 0.06 |
| AEA | 1.0 | 1.0 |
| Basic Physical Properties |  |  |
| $M_{100}$ (kgf/cm$^2$) | 51 | 57 |
| $T_B$ (kgf/cm$^2$) | 127 | 125 |
| $E_B$ (%) | 340 | 370 |
| $H_S$ Shore D hardness | 36 | 41 |
| FM (kgf/cm$^2$) | 2000 | 2500 |
| gel content | 1.8 | 2.1 |
| Bonding Strength |  |  |
| peeling strength to urethane coating (g/cm) | 900 | 910 |
| bonding strength to nylon (kg/cm) | 7.1 | 7.0 |
| bonding strength to polyurethane (kg/cm) | 1.3 | 1.3 |
| bonding strength to steel sheet (kg/cm) | 6.2 | 6.1 |

EXAMPLE 168

A composition comprising 100 parts by weight of PP (1), 0.5 part by weight of MAH, 0.12 part by weight of DVB, 0.06 part by weight of peroxide (B) and 1.0 part by weight of AEA was stirred by a Henschel mixer, and the mixture was extruded at 220° C. in a nitrogen atmosphere by a twin-screw extruder to obtain a thermoplastic resin composition.

EXAMPLE 169

A composition comprising 100 parts by weight of PP (2), 0.5 part by weight of MAH, 0.12 part by weight of DVB, 0.06 part by weight of peroxide (B) and 1.0 part by weight of AEA was stirred by a Henschel mixer, and the mixture was extruded at 220° C. in a nitrogen atmosphere by a twin-screw extruder.

The physical properties of the compositions obtained in Examples 168 and 169 are shown in Table 24.

TABLE 24

|  | E168 | E169 |
| --- | --- | --- |
| Composition |  |  |
| PP (1) | 100 | — |
| PP (2) | — | 100 |
| MAH | 0.5 | 0.5 |
| DVB | 0.12 | 0.12 |
| peroxide (B) | 0.06 | 0.06 |
| AEA | 1.0 | 1.0 |
| Basic Physical Properties |  |  |
| stress at yield point (kgf/cm$^2$) | 375 | 295 |
| tensile strength at break (kgf/cm$^2$) | 250 | 220 |
| elongation at break (%) | 500 | 205 |
| initial flexural modulus (kgf/cm$^2$) | 17000 | 14000 |
| Bonding Strength |  |  |
| peeling strength to urethane coating (g/cm) | 900 | 890 |
| bonding strength to nylon (kg/cm) | * | * |
| bonding strength to polyurethane (kg/cm) | 1.1 | 1.2 |
| bonding strength to steel sheet (kg/cm) | * | * |

*breaking of substrate

EXAMPLE 170

By a Banbury mixer, 75 parts by weight of an ethylene/propylene/ethylidene-norbornene copolymer (ethylene content = 70 mole %, iodine value = 12, Mooney viscosity $ML_{1-4}$ (100° C.) = 120; hereinafter referred to as "EPDM (5)") was kneaded with 25 parts by weight of PP in a nitrogen atmosphere at 180° C. for 5 minutes, and the mixture was passed through rolls and formed to a square pellet by a sheet cutter.

Then, the obtained square pellet was mixed and stirred with 0.5 part by weight of MAH, 0.5 part by weight of DVB and 0.3 part by weight of peroxide (A) by a Henschel mixer.

The mixture was extruded at 220° C. in a nitrogen atmosphere by a single-screw extruder having an L/D ratio of 30 and a screw diameter of 50 mm.

The obtained square pellet was mixed with 1.0 part by weight of AEA and the mixture was extruded at 220° C. in a nitrogen atmosphere by a single-screw extruder to form a thermoplastic elastomer.

The gel content and physical properties were determined according to the above-mentioned methods, and the obtained results are shown in Table 25.

Then, the thermoplastic elastomer was extruded in the form of a sheet at an extrusion temperature of 220° C. and a pulling speed of 2.5 m/min by a T-die extrusion molding machine supplied by Toshiba Kikai, which had a diameter of 90 mm and comprised a coat hanger die and a full-flighted screw and in which the L/D ratio was 22. The extruded sheet-shaped thermoplastic elastomer in the molten state was passed through a pair of rolls in the state laminated with a polyurethane sheet (Thermoplastic Polyurethane P26SRNAT supplied by Nippon Polyurethane; thickness=0.5 mm) so that the thermoplastic elastomer was contacted with the roll maintained at 60° C. and the polyurethane was contacted with the roll maintained at room temperature, whereby a laminate comprising (A) a thermoplastic elastomer layer having a thickness of 1.0 mm and (B) a polyurethane layer having a thickness of 0.5 mm was obtained. The interlaminar bonding strength of the obtained laminate was measured under conditions described below. The obtained results are shown in Table 25.

Test piece: width=25 mm, length=100 mm
Test method: 180° peeling
Pulling speed: 25 mm/min
Bonding strength: value obtained by dividing the peeling load by the width of the test piece.

Incidentally, the test piece where the substrate was broken is represented as "breaking of substrate" in Table 25.

COMPARATIVE EXAMPLE 17

The procedures of Example 170 was repeated in the same manner except that MAH and AEA were not added.

EXAMPLE 171

The procedures of Example 170 were repeated in the same manner except that 1.0 part by weight of triethylenetetramine was used instead of AEA.

EXAMPLE 172

The procedures of Example 170 were repeated in the same manner except that the amount incorporated of peroxide (A) was changed to 0.4 part by weight, the amount incorporated of MAH was changed to 1.0 part by weight and the amount incorporated of AEA was changed to 2.0 parts by weight.

EXAMPLE 173

The procedures of Example 170 were repeated in the same manner except that 30 parts by weight of the oil was incorporated in addition to the starting polymers EPDM (5) and PP.

EXAMPLE 174

The procedures of Example 173 were repeated in the same manner except that 1.0 part by weight of triethylenetetramine was used instead of AEA.

EXAMPLE 175

The procedures of Example 173 were repeated in the same manner except that the amount incorporated of peroxide (A) was changed to 0.4 part by weight, the amount incorporated of MAH was changed to 1.0 part by weight and the amount incorporated of AEA was changed to 2.0 parts by weight.

EXAMPLE 176

The procedures of Example 173 were repeated in the same manner except that a polyurethane foam having a foaming ratio of 40 and a thickness of 4 mm was used instead of the polyurethane sheet.

EXAMPLE 177

The procedures of Example 173 were repeated in the same manner except that the amounts incorporated of EPDM (5), PP, IIR, the oil, MAH and AEA were changed as shown in Table 25.

COMPARATIVE EXAMPLE 18

The procedures of Example 170 were repeated in the same manner except that MAH and AEA were not added.

EXAMPLE 178

The procedures of Example 170 were repeated in the same manner except that the amounts incorporated of DVB and peroxide (A) were changed.

EXAMPLE 179

The procedures of Example 173 were repeated in the same manner except that the amounts incorporated of DVB and peroxide (A) were changed.

TABLE 25

| | E170 | R17 | E171 | E172 | E173 | E174 | E175 | E176 | E177 | R18 | E178 | E179 |
|---|---|---|---|---|---|---|---|---|---|---|---|---|
| Composition | | | | | | | | | | | | |
| EPDM (5) (parts by weight) | 75 | 75 | 75 | 75 | 75 | 75 | 75 | 75 | 55 | 75 | 75 | 75 |
| PP (parts by weight) | 25 | 25 | 25 | 25 | 25 | 25 | 25 | 25 | 45 | 25 | 25 | 25 |
| IIR (parts by weight) | — | — | — | — | 10 | 10 | 10 | 10 | 20 | — | — | 10 |
| oil (parts by weight) | — | — | — | — | 30 | 30 | 30 | 30 | 40 | — | — | 30 |
| maleic anhydride (parts by weight) | 0.5 | — | 0.5 | 1.0 | 0.5 | 0.5 | 1.0 | 0.5 | 0.5 | — | 0.5 | 0.5 |
| N-aminoethylethanolamine (parts by weight) | 1.0 | — | — | 2.0 | 1.0 | — | 2.0 | 1.0 | 1.0 | — | 1.0 | 1.0 |
| triethylenetetramine (parts by weight) | — | — | 1.0 | — | — | 1.0 | — | — | — | — | — | — |
| divinylbenzene (parts by weight) | 0.5 | — | 0.5 | 0.5 | 0.5 | 0.5 | 0.5 | 0.5 | 0.5 | 0.5 | 0.06 | 0.06 |
| peroxide (A) (parts by weight) | 0.3 | — | 0.3 | 0.4 | 0.3 | 0.3 | 0.4 | 0.3 | 0.3 | 0.3 | 0.03 | 0.03 |
| Physical Properties | | | | | | | | | | | | |
| gel content of EODM (% by weight) | 97 | 96 | 97 | 98 | 97 | 97 | 98 | 97 | 55 | 96 | 1 | 2 |
| strength (kgf/cm$^2$) | 98 | 95 | 97 | 97 | 86 | 87 | 87 | 86 | 150 | 97 | 45 | 43 |

TABLE 25-continued

| | E170 | R17 | E171 | E172 | E173 | E174 | E175 | E176 | E177 | R18 | E178 | E179 |
|---|---|---|---|---|---|---|---|---|---|---|---|---|
| softness: torsion stiffness (kgf/cm$^2$) | 80 | 86 | 80 | 79 | 65 | 69 | 66 | 65 | 420 | 81 | 37 | 30 |
| moldability (g/10 min) | 1.0 | 1.5 | 0.9 | 0.7 | 4.5 | 4.3 | 3.5 | 4.5 | 3.5 | 1.1 | 15 | 30 |
| bonding strength (g/cm) | * | below 0.01 | * | * | * | * | * | * | 10.0 | below 0.01 | 900 | 910 |

E176: elastomer layer was laminated with polyurethane foam
*breaking of substrate

We claim:

1. A partially cross-linked thermoplastic elastomer composition having excellent adhesion capability to a polyurethane resin, which is formed by blending under heating 100 parts by weight of a thermoplastic elastomer, obtained by dynamically heat-treating a blend of (a) 95 to 40 parts by weight of an ethylene/propylene/unconjugated diene rubber having Mooney viscosity $ML_{1+4}$ (100° C.) of 40 to 120 and having iodine value of smaller than 16, and (b) 5 to 60 parts by weight of a polypropylene (the sum of components (a) and (b) is 100 parts by weight) and (c) 0.01 to 10 parts by weight of an unsaturated carboxylic acid or a derivative thereof in the presence of an organic peroxide in an amount of 0.2 to 1% by weight based on the sum of the components (a), (b) and (c), with (d) 0.01 to 10 parts by weight of N-aminoethylethanolamine or triethylene-tetramine as an agent for enhancing the adhesion to a polyurethane resin, with the proviso that said thermoplastic elastomer composition has a gel content of 40 to 97% by weight.

2. A thermoplastic elastomer composition as set forth in claim 1, wherein at least one additive selected from the group consisting of (e) 0.01 to 100 parts by weight of a peroxide-uncross-linkable rubbery substance, (f) 0.01 to 200 parts by weight of a mineral oil type softener and (g) 0.01 to 100 parts by weight of a fibrous filler per 100 parts by weight of the sum of the components (a) and (b) is further incorporated into the blend.

3. A thermoplastic elastomer composition as set forth in claim 1, wherein the unsaturated carboxylic acid or the derivative thereof is maleic anhydride.

* * * * *